(12) United States Patent
Garten et al.

(10) Patent No.: US 12,273,573 B2
(45) Date of Patent: Apr. 8, 2025

(54) DISTRIBUTION AND PLAYBACK OF MEDIA CONTENT

(71) Applicant: S.A. Vitec, Paris (FR)

(72) Inventors: Eliezer Garten, Mountain View, CA (US); Dror Lupu, Holon (IL); Ran Kenig, Hold-Hasharon (IL)

(73) Assignee: S.A. Vitec, Paris (FR)

( * ) Notice: Subject to any disclaimer, the term of this patent is extended or adjusted under 35 U.S.C. 154(b) by 0 days.

(21) Appl. No.: 18/663,164

(22) Filed: May 14, 2024

(65) Prior Publication Data

US 2025/0056071 A1    Feb. 13, 2025

Related U.S. Application Data

(63) Continuation of application No. 16/902,908, filed on Jun. 16, 2020, now Pat. No. 12,015,809, which is a
(Continued)

(51) Int. Cl.
| | | |
|---|---|---|
| *H04N 21/234* | (2011.01) | |
| *H04N 21/2343* | (2011.01) | |
| *H04N 21/2347* | (2011.01) | |
| *H04N 21/25* | (2011.01) | |
| *H04N 21/258* | (2011.01) | |

(Continued)

(52) U.S. Cl.
CPC . *H04N 21/234309* (2013.01); *H04N 21/2343* (2013.01); *H04N 21/2347* (2013.01); *H04N 21/251* (2013.01); *H04N 21/25891* (2013.01); *H04N 21/2662* (2013.01); *H04N 21/4402* (2013.01); *H04N 21/6175* (2013.01); *H04N 21/6405* (2013.01); *H04N 21/64322* (2013.01);
(Continued)

(58) Field of Classification Search
None
See application file for complete search history.

(56) References Cited

U.S. PATENT DOCUMENTS

| | | |
|---|---|---|
| 6,097,383 A | 8/2000 | Gaughan et al. |
| 6,115,080 A | 9/2000 | Reitmeier |

(Continued)

FOREIGN PATENT DOCUMENTS

| | | |
|---|---|---|
| EP | 2924999 A1 | 9/2015 |
| WO | 2016063780 A1 | 4/2016 |

OTHER PUBLICATIONS

Office Action mailed Dec. 19, 2023 in UAE Application P6001149/2020.
(Continued)

*Primary Examiner* — Mushfikh I Alam
(74) *Attorney, Agent, or Firm* — Polsinelli LLP

(57) ABSTRACT

Techniques and systems are provided for processing media data. For example, methods, apparatuses, and computer-readable media are described that can include receiving a multicast stream of media content, and dividing the multicast stream of media content into data fragments. In some cases, the multicast stream of media content can be transcoded from a first media format to a second media format. The data fragments can be transmitted, over one or more Transmission Control Protocol (TCP) channels using a web socket protocol, to a browser of the computing device for playback.

20 Claims, 13 Drawing Sheets

Related U.S. Application Data continuation of application No. 16/268,331, filed on Feb. 5, 2019, now Pat. No. 10,728,589.

(60) Provisional application No. 62/754,441, filed on Nov. 1, 2018, provisional application No. 62/631,480, filed on Feb. 15, 2018.

(51) Int. Cl.
| | |
|---|---|
| *H04N 21/2662* | (2011.01) |
| *H04N 21/4402* | (2011.01) |
| *H04N 21/61* | (2011.01) |
| *H04N 21/64* | (2011.01) |
| *H04N 21/6405* | (2011.01) |
| *H04N 21/643* | (2011.01) |
| *H04N 21/81* | (2011.01) |
| *H04N 21/845* | (2011.01) |

(52) U.S. Cl.
CPC ..... *H04N 21/8173* (2013.01); *H04N 21/8456* (2013.01)

(56) References Cited

U.S. PATENT DOCUMENTS

| | | | |
|---|---|---|---|
| 9,510,033 | B1 | 11/2016 | Corley et al. |
| 9,584,570 | B2 | 2/2017 | Neff |
| 10,757,360 | B1* | 8/2020 | Breitman ................ H04N 7/01 |
| 11,315,570 | B2* | 4/2022 | Allibhai ............... G10L 21/028 |
| 2003/0023982 | A1 | 1/2003 | Lee et al. |
| 2005/0028206 | A1 | 2/2005 | Cameron et al. |
| 2005/0049855 | A1* | 3/2005 | Chong-White ....... G10L 19/173 |
| | | | 704/219 |
| 2005/0071782 | A1 | 3/2005 | Barrett et al. |
| 2006/0140591 | A1 | 6/2006 | Estevez et al. |
| 2007/0011702 | A1 | 1/2007 | Vaysman |
| 2007/0055989 | A1 | 3/2007 | Shanks et al. |
| 2007/0204302 | A1 | 8/2007 | Calzone et al. |
| 2010/0115554 | A1 | 5/2010 | Drouet et al. |
| 2010/0242080 | A1 | 9/2010 | Henry |
| 2010/0254370 | A1 | 10/2010 | Jana et al. |
| 2011/0299448 | A1 | 12/2011 | Meier et al. |
| 2012/0090009 | A1 | 4/2012 | Cook et al. |
| 2013/0046849 | A1 | 2/2013 | Wolf et al. |
| 2013/0198767 | A1 | 8/2013 | Wang et al. |
| 2014/0123199 | A1 | 5/2014 | Kim et al. |
| 2014/0282777 | A1 | 9/2014 | Gonder et al. |
| 2014/0282784 | A1 | 9/2014 | Pfeffer |
| 2015/0070585 | A1 | 3/2015 | Sharif-Ahmadi et al. |
| 2015/0163273 | A1 | 6/2015 | Radcliffe |
| 2015/0289129 | A1 | 10/2015 | Mustafa et al. |
| 2015/0304737 | A1 | 10/2015 | Franklin et al. |
| 2015/0350736 | A1 | 12/2015 | Chan et al. |
| 2016/0044078 | A1* | 2/2016 | Hosur .................... H04L 67/02 |
| | | | 709/219 |
| 2016/0044080 | A1 | 2/2016 | duBreuil |
| 2016/0142775 | A1 | 5/2016 | Kim |
| 2016/0198214 | A1 | 7/2016 | Levy et al. |
| 2016/0205185 | A1 | 7/2016 | Gampel et al. |
| 2016/0212037 | A1 | 7/2016 | Yutani et al. |
| 2016/0249114 | A1 | 8/2016 | Ryu |
| 2016/0366202 | A1 | 12/2016 | Phillips et al. |
| 2017/0264967 | A1 | 9/2017 | Yamagishi |
| 2017/0289616 | A1 | 10/2017 | Igarashi et al. |
| 2018/0027295 | A1 | 1/2018 | Lee et al. |
| 2018/0351868 | A1 | 12/2018 | Cartwright et al. |
| 2019/0028705 | A1* | 1/2019 | Xu ......................... H04N 19/40 |
| 2019/0191008 | A1* | 6/2019 | Hooper .................. H04L 67/61 |
| 2020/0204804 | A1 | 6/2020 | Chen et al. |
| 2021/0217413 | A1 | 7/2021 | Tushinskiy et al. |
| 2023/0262234 | A1* | 8/2023 | Amini ................ H04L 43/0858 |
| | | | 709/219 |

OTHER PUBLICATIONS

Office Action mailed Jan. 12, 2023 in Israeli Application 276064.
Office Action mailed Jan. 30, 2023 in Australian Application 2019222503.
International Preliminary Report on Patentability mailed Aug. 18, 2020 in International Application PCT/US2019/016696.
Office Action mailed Jan. 24, 2023 in Japanese Application 2020-566195.
Decision to Grant mailed Apr. 4, 2023 in Japanese Application 2020-566195.
Office Action mailed Apr. 11, 2023 in European Application 19706342.3.
Office Action mailed Apr. 3, 2023 in Canadian Application 3088790.
Office Action mailed Apr. 20, 2023 in Australian Application 2019222503.
International Search Report and Written Opinion mailed Mar. 29, 2019 in International Application PCT/US2019/016696.
Office Action mailed Dec. 27, 2019 in U.S. Appl. No. 16/268,331.
Office Action mailed Feb. 14, 2020 in U.S. Appl. No. 16/268,331.
Notice of Allowance mailed Jun. 12, 2020 in U.S. Appl. No. 16/268,331.
Office Action mailed Jun. 15, 2021 in U.S. Appl. No. 16/902,908.
Office Action mailed Dec. 1, 2021 in U.S. Appl. No. 16/902,908.
Office Action mailed Jun. 27, 2022 in U.S. Appl. No. 16/902,908.
Office Action mailed Dec. 7, 2022 in U.S. Appl. No. 16/902,908.
Office Action mailed Jul. 21, 2023 in U.S. Appl. No. 16/902,908.
Office Action mailed Nov. 16, 2023 in U.S. Appl. No. 16/902,908.
Office Action mailed Dec. 20, 2023 in U.S. Appl. No. 16/902,908.
Notice of Allowance mailed Feb. 15, 2024 in U.S. Appl. No. 16/902,908.
Office Action dated Sep. 30, 2024 in Australian Patent Application 2023263552.

* cited by examiner

DISTRIBUTION AND PLAYBACK OF MEDIA CONTENT

CROSS-REFERENCE TO RELATED APPLICATIONS

The present application is a continuation of U.S. patent application Ser. No. 16/902,908 filed Jun. 16, 2020, which is a continuation of U.S. patent application Ser. No. 16/268,331, filed Feb. 5, 2019, now U.S. Pat. No. 10,728,589, which claims the benefit of U.S. Provisional Application No. 62/631,480, filed Feb. 15, 2018, and also claims the benefit of U.S. Provisional Application No. 62/754,441, filed Nov. 1, 2018, which are incorporated herein by reference in their entireties.

FIELD

The present disclosure relates generally to distribution and playback of media content. For example, systems, methods, apparatus, and computer-readable media are provided for providing secure, low delay, bandwidth optimized distribution of media content for playback on standard web browsers and/or other suitable playback platform.

SUMMARY

Certain aspects and features of the present disclosure relate to distribution of media content for playback on standard web browsers and/or other suitable playback platforms. For example, in order to support playback of media content without compromising costs, latency, footprint, and overall user experience, and without the need to rely on browser plugins and/or extensions, the systems and techniques described herein provide for distribution and playback of media content through a network (e.g., an enterprise network or other organizational network, or any other suitable network) to any type of web-based browser and/or other type of web-based media player. In some examples, the media content can include digital internet protocol (IP) based media streams with video and audio, or other suitable media content. The systems and techniques described herein allow for low latency, smooth playback of a single video or multiple videos (e.g., high definition videos or other suitable video content). In various examples, the systems and techniques allow for transitions between different content, multi-window support, audio support, metadata support (e.g., Key-Length-Value (KLV) metadata, STANAG metadata, and/or other type of metadata), and encryption support (e.g., Advanced Encryption Standard (AES) or other suitable encryption standard). For example, in some cases, systems and techniques described herein can provide the ability to transition between a single view (with a single video) and a mosaic view (with multiple videos), where the audio and video of the media content stay in synchronization.

According to at least one example, a method of processing media data is provided. The method includes receiving, at a computing device, a multicast stream of media content. The method further includes generating, by the computing device, a unicast stream of media content from the multicast stream of media content. The method further includes transcoding, by the computing device, the unicast stream of media content from a first media format to a second media format. The method further includes transmitting, over one or more Transmission Control Protocol (TCP) channels using a web socket protocol, the transcoded unicast stream of media content to a browser of the computing device for playback.

In another example, an apparatus for processing media data is provided that includes a memory configured to store video data and a processor. The processor is configured to and can receive a multicast stream of media content. The processor is further configured to and can generate a unicast stream of media content from the multicast stream of media content. The processor is further configured to and can transcode the unicast stream of media content from a first media format to a second media format. The processor is further configured to and can transmit, over one or more Transmission Control Protocol (TCP) channels using a web socket protocol, the transcoded unicast stream of media content to a browser of the computing device for playback.

In another example, a non-transitory computer-readable medium is provided that has stored thereon instructions that, when executed by one or more processors, cause the one or more processor to: receive a multicast stream of media content; generate a unicast stream of media content from the multicast stream of media content; transcode the unicast stream of media content from a first media format to a second media format; and transmit, over one or more Transmission Control Protocol (TCP) channels using a web socket protocol, the transcoded unicast stream of media content to a browser of the computing device for playback In another example, an apparatus for processing media data is provided. The apparatus includes means for receiving a multicast stream of media content. The apparatus further includes means for generating a unicast stream of media content from the multicast stream of media content. The apparatus further includes means for transcoding the unicast stream of media content from a first media format to a second media format. The apparatus further includes means for transmitting, over one or more Transmission Control Protocol (TCP) channels using a web socket protocol, the transcoded unicast stream of media content to a browser of the computing device for playback.

In some examples, the method, apparatuses, and non-transitory computer-readable medium described above can include receiving the transcoded unicast stream of media content on a local port (e.g., a local Hypertext Transfer Protocol (HTTP) port) of the apparatuses or computing device. In such cases, the transcoded unicast stream of media content is transmitted from the port (e.g., the HTTP port) to the browser using the web socket protocol.

In some examples, the method, apparatuses, and non-transitory computer-readable medium described above can include decrypting one or more payloads of the multicast stream of media content.

In some examples, the method, apparatuses, and non-transitory computer-readable medium described above can include displaying, by the computing device or apparatuses, the transcoded unicast stream of media content using the browser (or a media player implemented by the browser).

In some examples, the method, apparatuses, and non-transitory computer-readable medium described above can include storing one or more video frames of the unicast stream of media content. In some examples, the stored one or more video frames of the unicast stream of media content are not transcoded. In some examples, the method, apparatuses, and non-transitory computer-readable medium described above can include displaying, by the computing device or apparatuses, the stored one or more video frames using the browser (or a media player implemented by the browser).

In some examples, the method, apparatuses, and non-transitory computer-readable medium described above can include receiving, at the computing device or apparatuses, an additional multicast stream of media content. In such cases, the process includes generating, by the computing device or apparatuses, an additional unicast stream of media content from the an additional multicast stream of media content, and storing one or more video frames of the additional unicast stream of media content. In such cases, the method, apparatuses, and non-transitory computer-readable medium described above can further include displaying, by the computing device (or apparatuses) using the browser, the transcoded unicast stream of media content in a first portion of a display of the computing device (or apparatuses), and displaying, by the computing device (or apparatuses) using the browser, the stored one or more video frames of the additional unicast stream of media content in a second portion of a display of the computing device (or apparatuses).

In some examples, the method, apparatuses, and non-transitory computer-readable medium described above can include receiving (by the computing device or apparatuses) information associated with an amount of CPU consumption of the computing device (or apparatuses), and adjusting a number of frames from the unicast stream of media content that are stored in the memory. In such examples, the number of frames can be adjusted in response to the information associated with the amount of CPU consumption. In some cases, the method, apparatuses, and non-transitory computer-readable medium described above can include adjusting a resolution of one or more video frames in response to the information associated with the amount of CPU consumption. In some examples, the resolution can be adjusted without adjusting the frame rate at which the frames are stored and provided to the browser for playback.

In some examples, the method, apparatuses, and non-transitory computer-readable medium described above can include decreasing the number of frames from the unicast stream of media content that are stored in the memory when the information associated with the amount of CPU consumption indicates the CPU consumption has exceeded a CPU consumption threshold. In some examples, the method, apparatuses, and non-transitory computer-readable medium described above can include increasing the number of frames from the unicast stream of media content that are stored in the memory when the information associated with the amount of CPU consumption indicates the CPU consumption is below a CPU consumption threshold. In some examples, the method, apparatuses, and non-transitory computer-readable medium described above can include decreasing the number of frames from the unicast stream of media content that are stored in the memory when the information associated with the amount of CPU consumption indicates the CPU consumption has increased. In some examples, the method, apparatuses, and non-transitory computer-readable medium described above can include increasing the number of frames from the unicast stream of media content that are stored in the memory when the information associated with the amount of CPU consumption indicates the CPU consumption has decreased.

In some examples, the method, apparatuses, and non-transitory computer-readable medium described above can include receiving information associated with an amount of random access memory (RAM) usage by the computing device, and adjusting a number of frames from the unicast stream of media content that are stored in the memory, wherein the number of frames are adjusted in response to the information associated with the amount of RAM usage. In some examples, the method, apparatuses, and non-transitory computer-readable medium described above can include adjusting a resolution of the one or more video frames in response to the information associated with the amount of RAM usage. In some examples, the resolution can be adjusted without adjusting the frame rate at which the frames are stored and provided to the browser for playback.

In some examples, the method, apparatuses, and non-transitory computer-readable medium described above can include decreasing the number of frames from the unicast stream of media content that are stored in the memory when the information associated with the amount of RAM usage indicates the RAM usage has exceeded a RAM usage threshold. In some examples, the method, apparatuses, and non-transitory computer-readable medium described above can include increasing the number of frames from the unicast stream of media content that are stored in the memory when the information associated with the amount of RAM usage indicates the RAM usage is below a RAM usage threshold. In some examples, the method, apparatuses, and non-transitory computer-readable medium described above can include decreasing the number of frames from the unicast stream of media content that are stored in the memory when the information associated with the amount of RAM usage indicates the RAM usage has increased. In some examples, the method, apparatuses, and non-transitory computer-readable medium described above can include increasing the number of frames from the unicast stream of media content that are stored in the memory when the information associated with the amount of RAM usage indicates the RAM usage has decreased.

In some examples, the method, apparatuses, and non-transitory computer-readable medium described above can include receiving information associated with an amount of resources used by the browser, and adjusting a number of frames from the unicast stream of media content that are stored in the memory, wherein the number of frames are adjusted in response to the information associated with the amount of resources used by the browser. In some examples, the method, apparatuses, and non-transitory computer-readable medium described above can include adjusting a resolution of the one or more video frames in response to the information associated with the amount of resources used by the browser. In some examples, the resolution can be adjusted without adjusting the frame rate at which the frames are stored and provided to the browser for playback.

In some examples, the method, apparatuses, and non-transitory computer-readable medium described above can include decreasing the number of frames from the unicast stream of media content that are stored in the memory when the information associated with the amount of resources used by the browser indicates the amount of resources has exceeded a resource usage threshold. In some examples, the method, apparatuses, and non-transitory computer-readable medium described above can include increasing the number of frames from the unicast stream of media content that are stored in the memory when the information associated with the amount of resources used by the browser indicates the amount of resources is below a resource usage threshold. In some examples, the method, apparatuses, and non-transitory computer-readable medium described above can include decreasing the number of frames from the unicast stream of media content that are stored in the memory when the information associated with the amount of resources used by the browser indicates the amount of resources has increased. In some examples, the method, apparatuses, and non-transitory computer-readable medium described above can include increasing the number of frames from the unicast stream of media content that are stored in the memory when the information associated with the amount of resources used by the browser indicates the amount of resources has decreased.

In some examples, the method, apparatuses, and non-transitory computer-readable medium described above can include extracting metadata from the unicast stream of media content, wherein the transcoded unicast stream of media content does not include the metadata. The metadata can include KLV metadata (e.g., frame-aligned, frame-accurate KLV metadata), or other suitable metadata. In some examples, the method, apparatuses, and non-transitory computer-readable medium described above can include combining the extracted metadata from the unicast stream of media content with the transcoded unicast stream of media content, and displaying the combined extracted metadata and the transcoded unicast stream of media content.

In some examples, the method, apparatuses, and non-transitory computer-readable medium described above can include recording, in a memory of the computing device (or apparatuses), one or more payloads of the multicast stream.

In some cases, a plugin is not used for generating the unicast stream of media content and for transcoding the unicast stream of media content.

In some examples, the method, apparatuses, and non-transitory computer-readable medium described above can include generating one or more time stamps for one or more packets of the unicast stream of media content, and associating the one or more time stamps with the one or more packets of the unicast stream of media content. In such examples, time stamps can be added to audio packets, video packets, and metadata packets of the unicast stream of media content.

In some examples, the method, apparatuses, and non-transitory computer-readable medium described above can include generating a request to receive the multicast stream of video; and transmitting the request to a video source, wherein the multicast stream of video is received in response to the request.

In some examples, the media content includes video content and audio content.

According to at least one other example, a method of processing media data is provided. The method can include receiving, at a computing device, a multicast stream of media content, and generating, by the computing device, a unicast stream of media content from the multicast stream of media content. The method can further include storing, by the computing device, one or more video frames of the unicast stream of media content. The method can further include transmitting, over one or more TCP channels using a web socket protocol, the one or more video frames of the unicast stream of media content to a browser for playback.

In another example, an apparatus for processing media data is provided that includes a memory configured to store video data and a processor. The processor is configured to and can receive a multicast stream of media content. The processor is configured to and can generate a unicast stream of media content from the multicast stream of media content. The processor is configured to and can store one or more video frames of the unicast stream of media content. The processor is configured to and can transmit, over one or more TCP channels using a web socket protocol, the one or more video frames of the unicast stream of media content to a browser for playback.

In another example, a non-transitory computer-readable medium is provided that has stored thereon instructions that, when executed by one or more processors, cause the one or more processor to: receive a multicast stream of media content; generate a unicast stream of media content from the multicast stream of media content; store one or more video frames of the unicast stream of media content; and transmit, over one or more TCP channels using a web socket protocol, the one or more video frames of the unicast stream of media content to a browser for playback.

In another example, an apparatus for processing media data is provided. The apparatus includes means for receiving, at a computing device, a multicast stream of media content, and generating, by the computing device, a unicast stream of media content from the multicast stream of media content. The apparatus further includes means for storing, by the computing device, one or more video frames of the unicast stream of media content. The apparatus further includes means for transmitting, over one or more TCP channels using a web socket protocol, the one or more video frames of the unicast stream of media content to a browser for playback.

In some examples, the method, apparatuses, and non-transitory computer-readable medium described above can include displaying, by the computing device or apparatuses, the stored one or more video frames using the browser.

In some examples, the method, apparatuses, and non-transitory computer-readable medium described above can include transcoding, by the computing device or apparatuses, the unicast stream of media content from a first media format to a second media format. In such examples, the method, apparatuses, and non-transitory computer-readable medium described above can include transmitting, over at least one TCP channel using a web socket protocol, the transcoded unicast stream of media content to a browser for playback. In such examples, the method, apparatuses, and non-transitory computer-readable medium described above can include displaying, by the computing device or apparatuses, the transcoded unicast stream of media content using the browser. In some cases, the transcoded unicast stream of media content is displayed using the browser instead of the stored one or more video frames in response to selection of the media content as an active stream. In some examples, the stored one or more video frames of the unicast stream of media content are not transcoded In some examples, the method, apparatuses, and non-transitory computer-readable medium described above can include receiving, at a computing device, an additional multicast stream of media content, and generating, by the computing device (or apparatuses), an additional unicast stream of media content from the additional multicast stream of media content. The method, apparatuses, and non-transitory computer-readable medium described above can include storing, by the computing device (or apparatuses), one or more video frames of the additional unicast stream of media content. The method, apparatuses, and non-transitory computer-readable medium described above can further include displaying, by the computing device (or apparatuses) using the browser, the transcoded unicast stream of media content as an active stream in a first portion of a display of the computing device (or apparatuses), and displaying, by the computing device (or apparatuses) using the browser, the stored one or more video frames of the additional unicast stream of media content in a second portion of the display of the computing device (or apparatuses).

In some examples, the method, apparatuses, and non-transitory computer-readable medium described above can include transcoding, by the computing device (or apparatuses), the additional unicast stream of media content from the first media format to the second media format. In some cases, the method, apparatuses, and non-transitory computer-readable medium described above can include receiving input corresponding to a selection of content displayed in the second portion of the display, wherein the content includes the one or more video frames of the additional unicast stream of media content. The method, apparatuses, and non-transitory computer-readable medium described above can include displaying, in response to the selection of the content displayed in the second portion of the display, the transcoded additional unicast stream of media content as an active stream in the second portion of the display of the computing device. The method, apparatuses, and non-transitory computer-readable medium described above can further include displaying, in response to the selection of the content displayed in the second portion of the display, the stored one or more video frames of the unicast stream of media content in the first portion of the display of the computing device.

In some examples, the method, apparatuses, and non-transitory computer-readable medium described above can include receiving (by the computing device or apparatuses) information associated with an amount of CPU consumption of the computing device (or apparatuses), and adjusting a number of frames from the unicast stream of media content that are stored in the memory. In such examples, the number of frames can be adjusted in response to the information associated with the amount of CPU consumption. In some cases, the method, apparatuses, and non-transitory computer-readable medium described above can include adjusting a resolution of one or more video frames in response to the information associated with the amount of CPU consumption. In some examples, the resolution can be adjusted without adjusting the frame rate at which the frames are stored and provided to the browser for playback.

In some examples, the method, apparatuses, and non-transitory computer-readable medium described above can include decreasing the number of frames from the unicast stream of media content that are stored in the memory when the information associated with the amount of CPU consumption indicates the CPU consumption has exceeded a CPU consumption threshold. In some examples, the method, apparatuses, and non-transitory computer-readable medium described above can include increasing the number of frames from the unicast stream of media content that are stored in the memory when the information associated with the amount of CPU consumption indicates the CPU consumption is below a CPU consumption threshold. In some examples, the method, apparatuses, and non-transitory computer-readable medium described above can include decreasing the number of frames from the unicast stream of media content that are stored in the memory when the information associated with the amount of CPU consumption indicates the CPU consumption has increased. In some examples, the method, apparatuses, and non-transitory computer-readable medium described above can include increasing the number of frames from the unicast stream of media content that are stored in the memory when the information associated with the amount of CPU consumption indicates the CPU consumption has decreased.

In some examples, the method, apparatuses, and non-transitory computer-readable medium described above can include receiving information associated with an amount of random access memory (RAM) usage by the computing device, and adjusting a number of frames from the unicast stream of media content that are stored in the memory, wherein the number of frames are adjusted in response to the information associated with the amount of RAM usage. In some examples, the method, apparatuses, and non-transitory computer-readable medium described above can include adjusting a resolution of the one or more video frames in response to the information associated with the amount of RAM usage. In some examples, the resolution can be adjusted without adjusting the frame rate at which the frames are stored and provided to the browser for playback.

In some examples, the method, apparatuses, and non-transitory computer-readable medium described above can include decreasing the number of frames from the unicast stream of media content that are stored in the memory when the information associated with the amount of RAM usage indicates the RAM usage has exceeded a RAM usage threshold. In some examples, the method, apparatuses, and non-transitory computer-readable medium described above can include increasing the number of frames from the unicast stream of media content that are stored in the memory when the information associated with the amount of RAM usage indicates the RAM usage is below a RAM usage threshold. In some examples, the method, apparatuses, and non-transitory computer-readable medium described above can include decreasing the number of frames from the unicast stream of media content that are stored in the memory when the information associated with the amount of RAM usage indicates the RAM usage has increased. In some examples, the method, apparatuses, and non-transitory computer-readable medium described above can include increasing the number of frames from the unicast stream of media content that are stored in the memory when the information associated with the amount of RAM usage indicates the RAM usage has decreased.

In some examples, the method, apparatuses, and non-transitory computer-readable medium described above can include receiving information associated with an amount of resources used by the browser, and adjusting a number of frames from the unicast stream of media content that are stored in the memory, wherein the number of frames are adjusted in response to the information associated with the amount of resources used by the browser. In some examples, the method, apparatuses, and non-transitory computer-readable medium described above can include adjusting a resolution of the one or more video frames in response to the information associated with the amount of resources used by the browser. In some examples, the resolution can be adjusted without adjusting the frame rate at which the frames are stored and provided to the browser for playback.

In some examples, the method, apparatuses, and non-transitory computer-readable medium described above can include decreasing the number of frames from the unicast stream of media content that are stored in the memory when the information associated with the amount of resources used by the browser indicates the amount of resources has exceeded a resource usage threshold. In some examples, the method, apparatuses, and non-transitory computer-readable medium described above can include increasing the number of frames from the unicast stream of media content that are stored in the memory when the information associated with the amount of resources used by the browser indicates the amount of resources is below a resource usage threshold. In some examples, the method, apparatuses, and non-transitory computer-readable medium described above can include decreasing the number of frames from the unicast stream of media content that are stored in the memory when the information associated with the amount of resources used by the browser indicates the amount of resources has increased. In some examples, the method, apparatuses, and non-transitory computer-readable medium described above can include increasing the number of frames from the unicast stream of media content that are stored in the memory when the information associated with the amount of resources used by the browser indicates the amount of resources has decreased.

According to at least one other example, another method of processing media data is provided. The method can include receiving, at a computing device, a multicast stream of media content. The method can further include generating, by the computing device, a unicast stream of media content from the multicast stream of media content. The method can further include dividing, by the computing device, the unicast stream of media content into data fragments, and transmitting, over one or more Transmission Control Protocol (TCP) channels using a web socket protocol, one or more data fragments of the unicast stream of media content to a browser for playback.

In another example, an apparatus for processing media data is provided that includes a memory configured to store video data and a processor. The processor is configured to and can receive a multicast stream of media content. The processor is configured to and can generate a unicast stream of media content from the multicast stream of media content. The processor is configured to and can divide the unicast stream of media content into data fragments. The processor is configured to and can transmit, over one or more Transmission Control Protocol (TCP) channels using a web socket protocol, one or more data fragments of the unicast stream of media content to a browser for playback.

In another example, a non-transitory computer-readable medium is provided that has stored thereon instructions that, when executed by one or more processors, cause the one or more processor to: receive a multicast stream of media content; generate a unicast stream of media content from the multicast stream of media content; divide the unicast stream of media content into data fragments, and transmit, over one or more Transmission Control Protocol (TCP) channels using a web socket protocol, one or more data fragments of the unicast stream of media content to a browser for playback.

In another example, an apparatus for processing media data is provided. The apparatus includes means for receiving a multicast stream of media content. The apparatus can further include means for generating a unicast stream of media content from the multicast stream of media content. The apparatus can further include means for dividing, by the computing device, the unicast stream of media content into data fragments. The apparatus can further include means for transmitting, over one or more Transmission Control Protocol (TCP) channels using a web socket protocol, one or more data fragments of the unicast stream of media content to a browser for playback.

In some examples, the method, apparatuses, and non-transitory computer-readable medium described above can include transcoding, by the computing device, the unicast stream of media content from a first media format to a second media format. Dividing the unicast stream of media content can include dividing the transcoded unicast stream of media content into the data fragments.

In some examples, the method, apparatuses, and non-transitory computer-readable medium described above can include receiving the one or more data fragments of the unicast stream of media content on a local Hypertext Transfer Protocol (HTTP) port. The one or more data fragments are transmitted from the HTTP port to the browser using the web socket protocol.

In some examples, the method, apparatuses, and non-transitory computer-readable medium described above can include decrypting one or more payloads of the multicast stream of media content.

In some examples, the method, apparatuses, and non-transitory computer-readable medium described above can include encrypting the one or more data fragments of the unicast stream of media content before transmitting the one or more data fragments to the browser.

In some examples, the method, apparatuses, and non-transitory computer-readable medium described above can include displaying, by the computing device using the browser, the one or more data fragments of the unicast stream of media content.

In some examples, the method, apparatuses, and non-transitory computer-readable medium described above can include storing the data fragments of the unicast stream of media content.

In some examples, the method, apparatuses, and non-transitory computer-readable medium described above can include storing one or more video frames of the unicast stream of media content. In some cases, the stored one or more video frames of the unicast stream of media content are not transcoded. In some examples, the method, apparatuses, and non-transitory computer-readable medium described above can include displaying, by the computing device, the stored one or more video frames using the browser.

In some examples, the method, apparatuses, and non-transitory computer-readable medium described above can include: receiving, at the computing device, an additional multicast stream of media content; generating, by the computing device, an additional unicast stream of media content from the an additional multicast stream of media content; storing one or more video frames of the additional unicast stream of media content; displaying, by the computing device using the browser, the one or more data fragments of the unicast stream of media content in a first portion of a display of the computing device; and displaying, by the computing device using the browser, the stored one or more video frames of the additional unicast stream of media content in a second portion of a display of the computing device.

In some examples, the method, apparatuses, and non-transitory computer-readable medium described above can include: obtaining performance data associated with the computing device; obtaining user data associated with the computing device, the user data including at least one of one or more types of channels viewed by a user using a media player of the computing device and a viewing configuration of the videos associated with the user; and obtaining a quality recommendation indicating a transcoding quality to generate when a particular channel is selected by the user on the computing device, wherein the quality recommendation is based on the performance data and the user data.

In some examples, the method, apparatuses, and non-transitory computer-readable medium described above can include: sending the performance data and the user data to a server; and receiving the quality recommendation from the server.

In some examples, the transcoding quality includes at least one of a resolution, a frame rate, and a bit rate of a video.

In some examples, the quality recommendation is determined using machine learning. In some cases, the machine learning is based on a neural network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
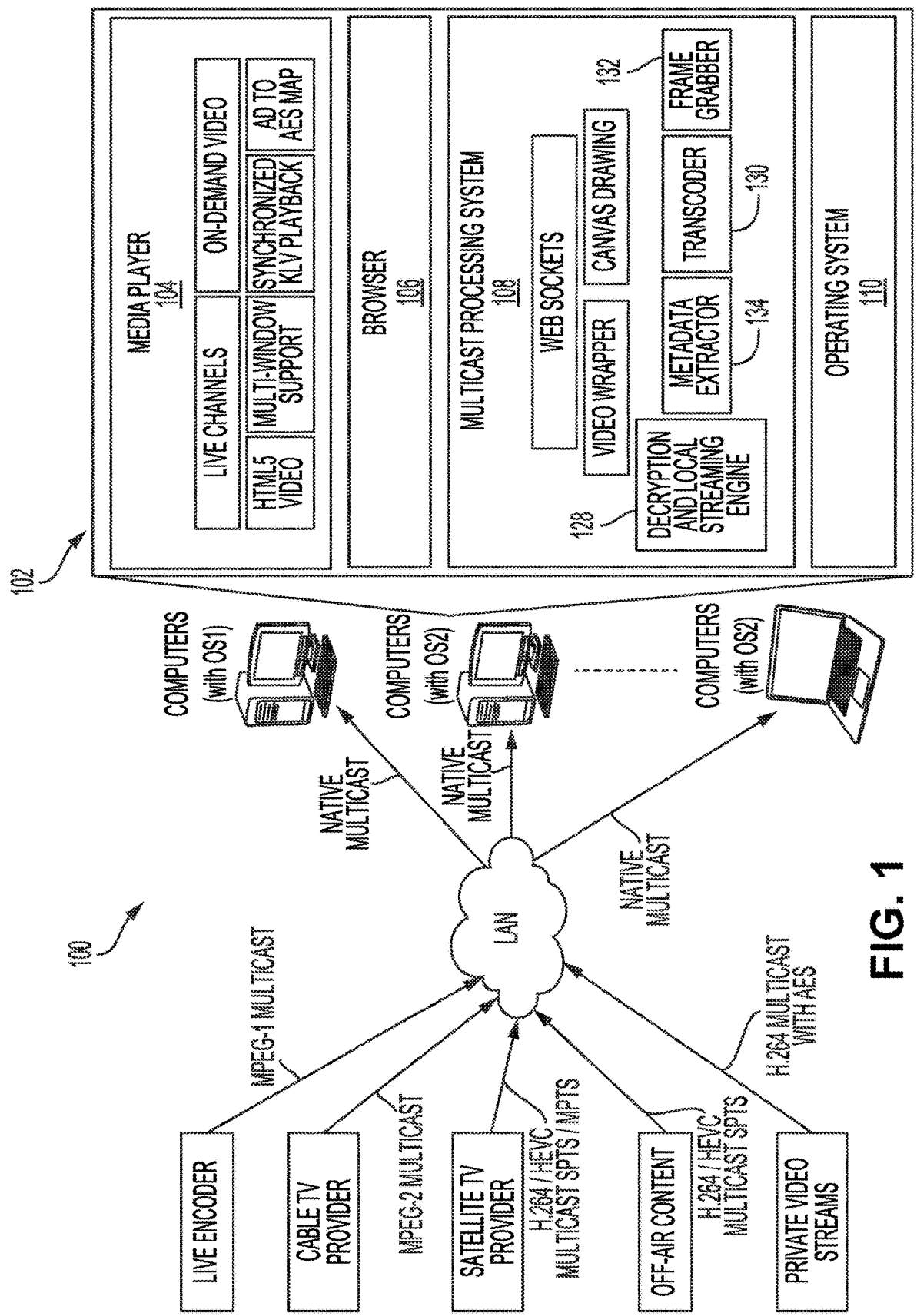
FIG. 1 is a block diagram showing an example system architecture, in accordance with some examples.

In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

As described in further detail below, certain aspects and features of the present disclosure relate to processing and distribution of media content for playback on standard web browsers and/or other suitable playback platforms (e.g., web-based media players, or other suitable types of media players). For example, in order to support playback of media content without compromising the costs, latency, footprint, and overall user experience, and without the need to rely on browser plugins and/or extensions, the systems and techniques described herein provide for distribution and playback of media content through a network (e.g., an enterprise network or other organizational network, or any other suitable network) to any type of web-based browser and/or other type of web-based media player. In some examples, the media content can include digital internet protocol (IP) based media streams with video and audio, or other suitable media content. The systems and techniques described herein allow for low latency, smooth playback of a single video or multiple videos (e.g., high definition videos or other suitable video content). In various examples, the systems and techniques allow for transitions between different content, multi-window support, audio support, metadata support (e.g., Key-Length-Value (KLV) metadata, STANAG metadata, and/or other type of metadata), and encryption support (e.g., Advanced Encryption Standard (AES) or other suitable encryption standard). For instance, as described in more detail below, systems and techniques described herein can provide the ability to transition between a single view (with a single video) and a mosaic view (with multiple videos), where the audio and video of the media content stay in synchronization.

The use of internet protocol (IP) based digital media has grown exponentially in almost all sectors, including, for example, consumer, broadcast, government, military, medical, corporate, and educational sectors. Digital media can include video, audio, and/or metadata. With content such as television (TV) channels, security video, military tactical and situational awareness video, locally produced video (e.g., corporate video) being encoded to IP streams, among others, organizations and/or other entities of any size are increasingly relying on these media streams (also referred to as video streams) for critical applications. It is desirable, and sometimes needed, for these organizations and/or entities to make this content available to their users from any computing device, such as a desktop computer, a laptop computer, a mobile device (e.g., a mobile phone, a tablet, a wearable device, and/or other suitable mobile device), and/or other suitable computing device. In some cases, consumption of the media content can be required inside the closed networks of the organizations and/or entities and over public networks between buildings or sites.

Existing solutions for processing, distribution, and playback of media content to users throughout a network (e.g., an organization's network) create several challenges. One example of such an issue is format compatibility. For example, media content (TV content, broadcast content, streaming content, military content, among other types of content) is typically produced in a particular format (e.g., in MPEG Transport Stream format, or other suitable format), which cannot be played back by some default media players. Illustrative examples of default media players include those incorporated by common operating system vendors such as Apple™, Microsoft™, and Google™. As a result, existing solutions need to transcode received media content to a media format that is natively supported by typical information technology (IT) environments. Illustrative examples of natively-supported media formats include Apple's HTTP Live Streaming (HLS), Adobe™ Flash, HTML5, among others. For instance, the transcoding process can include decoding the original video content (and possibly audio content) to baseband uncompressed video (and uncompressed audio, if present), and then re-encoding the content to a new format. In some cases, the content can be wrapped in a container defined by the browser vendors. As described herein, after transcoding to one of the "internet streaming" formats, the delivery to the client is based on unicast, meaning that a dedicated stream is sent to each computing device (e.g., a viewer or client device). For example, the unicast stream can come as a "package" with the selection to use a standard, such as HLS, HTML5, or Flash.

Another issue is equipment cost and points of failure. For instance, the transcoding process requires certain equipment (e.g., software, hardware, or both hardware and software), which adds to capital expenditure and operational expenditure, as well as additional footprint and compute power. Such overhead grows along with the growth in amount of content being consumed by the organization or entity. Further, since the transcoding process is a critical component in the data path, failure in this component will impact the quality of service of the video delivery solution. For instance, if the transcoding is performed at a server for multiple users, failure of the server during the transcoding process can affect many users.

Yet another issue is latency (also referred to as delay). For example, the transcoding process takes a certain amount of time to complete, which adds delay to when the video is ready for rendering and display after being received. Additionally, the transcoding process typically transcodes from the protocol at which the video was received (e.g., MPEG, HEVC, AVC, or other suitable format) to an Internet-oriented protocol (e.g., HLS, SST, Flash, or the like). Such Internet-oriented protocols have built-in buffering and/or caching in order to allow video receivers (and/or video players) to cope with and adjust for the reduced quality of service that may be experienced when streaming over the Internet, which is the network environment for which these streaming protocols were originally designed. The reduced quality of service can be due to, for example, bandwidth issues and/or other network quality issues. For example, the Internet experiences many glitches and up and down bandwidth spikes. A buffering delay or latency can be hardcoded into the Internet-oriented protocols so users will not experience the bandwidth discontinuity and will instead have continuous playback of media content.

The latency can vary from a few seconds to half a minute (or even longer in some cases). The latency associated with the buffering and/or caching can be much greater than the latency associated with the transcoding process. For example, the latency required for transcoding can be a few video frames, while the latency associated with buffering can be many seconds. For example, HLS may require five seconds of buffering (e.g., equivalent to approximately 150 video frames in a 30 frames per second (fps) video), which can be hardcoded into the protocol. The large amount of latency can be extremely challenging to cope with when real-time video is needed for critical tasks, such as, for example, monitoring a critical experiment, tracking targets in a military mission, watching a live sports game on a media device and/or inside a sports arena, performing a medical procedure, among others.

Bandwidth utilization is another issue that can arise with the processing, distribution, and playback of media content to users throughout a network. The use of traditional Internet streaming protocols, which are used in order to achieve native playback on browsers, dictates the use of individual unicast sessions for each viewer. Such a requirement for unicast sessions for each viewer creates an inefficient delivery scheme for large organizations that may have many users (e.g., thousands, tens of thousands, hundreds or thousands of users, or possibly more). In such cases, even when the same content is viewed by large groups of users, each user requires a separate copy of the stream (a "unicast stream"), thus adding overhead to the network core and demanding complex costly on-premise infra-structure.

Another issue is enterprise content protection support. Content providers (e.g., Comcast™, DirecTV™, Dish™, among others), military units, government units, hospitals, among other media content consumption organizations or entities are quickly adopting the use of Advanced Encryption Standard (AES) 128-256 bit Cipher Blocker Chaining (CBC) and/or Electronic Codebook (ECB) encryption for securing Internet Protocol television (IPTV) content. The AES standard is not supported natively in browsers (e.g., web browsers or mobile browsers).

Furthermore, displaying certain metadata can create issues. For example, with respect to military metadata, in intelligence, reconnaissance, and surveillance (ISR) applications, the use of the Motion Imagery Standard Board (MISB) Key-Length-Value (KLV) metadata has become a primary method of carrying critical information related to the video frames. This standard is implemented within the MPEG transport stream (TS) as a private packet identifier (PID), which is not a method or standard supported by any browser or any internet-oriented streaming protocol provided by the browser vendors.

In addition, some providers have opted to develop and install third-party applications and/or media players that support the original format of the media content (e.g., MPEG, Advanced Video Coding (AVC), High Efficiency Video Coding (HEVC), or the like), and that are able to take advantage of the multicast protocol and the network's capability to smartly manage multicast sessions using Internet Group Management Protocol (IGMP). Such third-party applications allow organizations to deliver multicast content in the original format of the media (e.g., MEPG content, AVC content, HEVC content, or the like) directly to users' playback devices.

In some cases, providers have created an even more convenient experience with offering their users MPEG (or other coding format) multicast players/decoders in the form of browser extensions or plugins so that users will be able to use browsers on their devices to access live IP video streams. A browser extension or plugin is a way to add a custom application into a browser that is not native to the browser. In one illustrative example, browser extensions (or plugins) can be created according to Netscape Plugin Application Programming Interface (NPAPI), which is an application programming interface (API) that allows browser extensions to be developed. However, a recent evolution of security best practices and decisions made by many browser providers (e.g., Google Chrome, Microsoft Edge, and Mozilla Firefox) have decided to discontinue the support for browser extensions (e.g., NPAPI browser extensions), rendering this approach for accepting MPEG multicast video into proprietary browser player applications infeasible to maintain moving forward. While the concept of browser extensions and plugins was eliminated, additional logic can still be added to browsers, but the additional logic must conform to certain security and vulnerability best practices. JavaScript is one of the widely used protocols that is allowed for use with web browsers.

The systems and methods described herein provide the distribution of media content for playback on standard web browsers and/or other suitable playback platform. The systems and methods allow continued use of existing encoders (e.g., MPEG encoders, AVC encoders, HEVC encoders, or the like) and existing bandwidth-efficient multicast streams. The solutions provided by the systems and methods described herein avoid the need to force enterprises and their users to change existing equipment and/or to change the existing methods of ingesting and streaming media content. The solutions also avoid the need to force the introduction of multi-unicast distribution servers and to overload networks with excessive numbers of video streams (due to a different unicast stream being required for each user). The systems and methods described herein can also remove the need to use a plugin with a browser, but still maintain the ability to tap into the same format as that of a received video stream so as to not require a server to transcode the video and provide the transcoded video as an individual unique unicast stream to each computing device, which is very inefficient from a bandwidth and processing standpoint.

FIG. 1 is a block diagram showing an example system architecture 100. As shown, each computing device (or computer) can includes a system 102 that can process incoming multicast media content according to the techniques described herein. The system 102 includes a media player 104, a browser 106, a multicast processing system 108, an operating system 110, among other components. In one illustrative example, the browser 106 can include a web browser, such as an HTML5 web browser or any other suitable web browser. The media player 104 can include a browser-based media player, also referred to as a web player. The multicast processing system 108 can include a decryption and local streaming engine 128, a metadata extractor 134, a transcoder 130, and a frame grabber 132, among other components. Different examples of the system 102 are described below with respect to FIG. 2 and FIG. 3, including systems 202 and 302. Details of the functionality of the decryption and local streaming engine 128, the metadata extractor 134, the transcoder 130, and the frame grabber 132, among other components of the multicast processing system 108 will be provided below with respect to FIG. 2 and FIG. 3.

Figure 2:
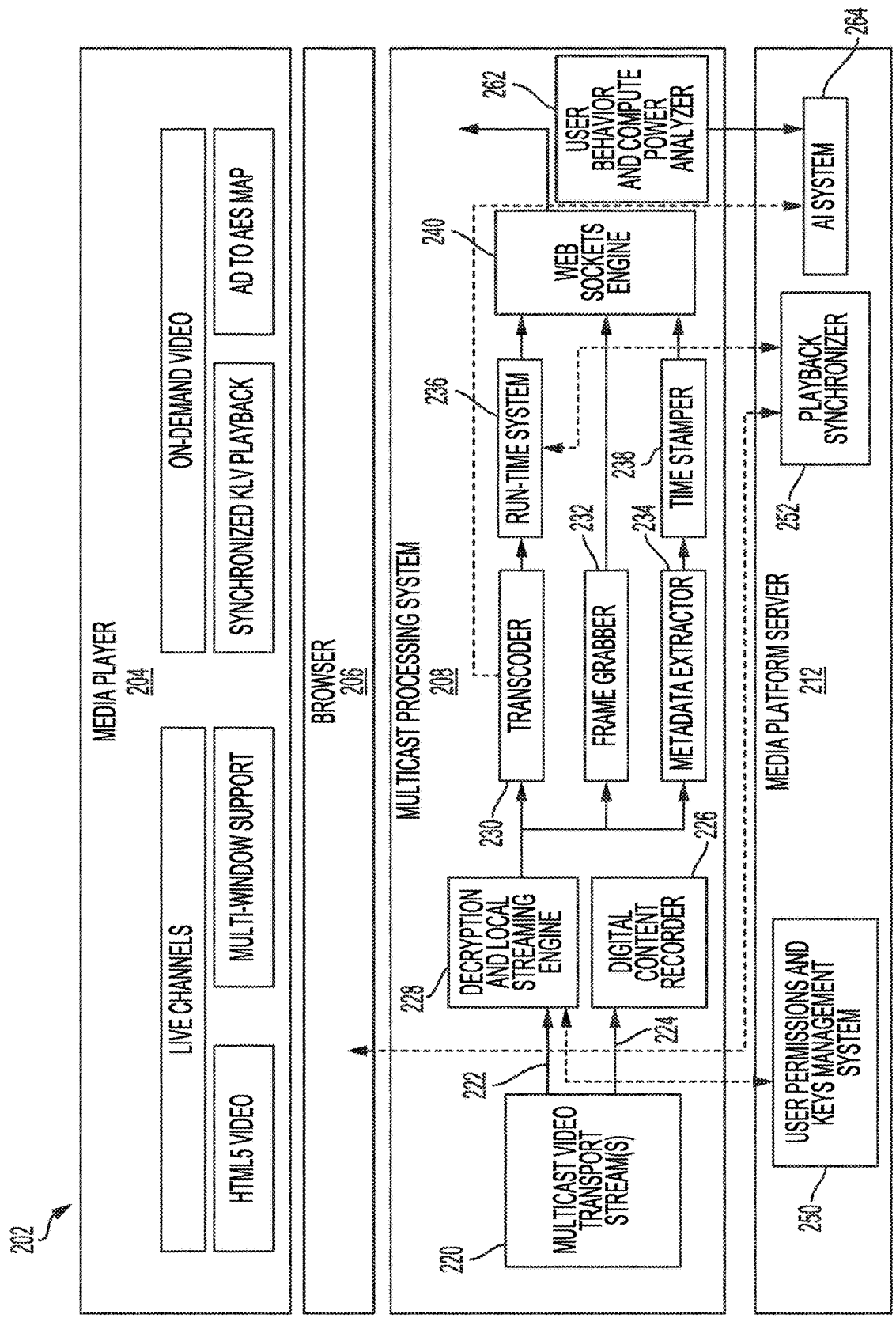
FIG. 2 is a block diagram showing an example of components used by a computing device for processing video content, in accordance with some examples.

FIG. 2 is a block diagram showing an example of components of a system 202 used by a computing device for processing multicast media content. The components of the system 202 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein. While the system 202 is shown to include certain components, one of ordinary skill will appreciate that the system 202 can include more or fewer components than those shown in FIG. 2.

The multicast processing system 208 can be a stand-alone software package that can be installed on a computing device and that can interact with one or more web browsers, media players (e.g., web players or other types of media players), operating systems, and/or other applications or programs installed on the computing device. In some cases, the multicast processing system 208 is platform agnostic, and thus can work with any type of computing device using any type of operating system, such as a computing device running a Macintosh™ operating system, a Windows™ operating system, a LINUX™ operating system, or any other operating system.

The system 202, using the multicast processing system 208, can implement the IGMP protocol (or other suitable protocol) to join any number of User Datagram Protocol (UDP) multicast Transport Streams (TS) requested by a given viewer through the computing device. For example, as shown in FIG. 2, the media content can be received as one or more multicast video transport streams 220. For example, the one or more multicast video transport streams 220 can be MPEG transport streams (MPEG-TS) received via multicast UDP. While UDP MPEG transport streams are standard in many environments (e.g., video broadcasting, medical, military, among others), the one or more multicast video transport streams 220 can be in any other suitable format, such as AVC, HEVC, or other suitable video format.

Each of the one or more multicast video transport streams 220 (each transport stream is referred to as a multicast TS) can include encrypted video and/or audio data (e.g., encrypted using AES or other suitable encryption method) and can also include metadata (e.g., KLV metadata or other suitable metadata). As described herein, the system 202 can handle any type of encryption, alleviating the problem that arises when a particular encryption standard (e.g., the AES encryption standard) is not supported natively in web browsers.

As shown in FIG. 2, two data paths are then created, including a first data path 222 and a second data path 224. Over the first data path 222, a multicast TS is sent to a digital content recorder 226, which can include a digital video recorder (DVR) or other suitable device or component that can record digital media content. For example, the original multicast TS payload of a multicast TS can be recorded in memory (e.g., when a recording (e.g., DVR) feature has been turned on). The multicast TS record stored in the memory retains the incoming video stream (and audio, if present) intact along with its encryption (e.g., AES encryption) and metadata (KLV/STANAG), if present in the TS.

The second data path 222 for the one or more multicast TSs is directed to a decryption and local streaming engine 228. In one illustrative example, the decryption and local streaming engine 228 can include an AES decryptor and local streamer. Any other type of encryption can be used in other examples. The decryption and local streaming engine 228 receives (from a user permissions and keys management system 250 of a media platform server 212) the needed encryption keys (e.g., AES keys if AES encryption is used, or other suitable encryption key for other encryption methods), and then activates an application that performs real-time decryption (e.g., AES decryption if AES encryption is used, or other suitable decryption for other encryption methods) of the TS payloads.

The decryption and local streaming engine 228 then generates a local unicast stream from each decrypted (or un-encrypted) multicast TS. The decryption and local streaming engine 228 transmits the unicast video and audio data payloads securely on the local host (the computing device on which this process is executed) such that no other application residing on the local host or attempting to access the payloads from a remote network computer can compromise the data. In some cases, a multicast TS may not include encryption, in which case the decryption and local streaming engine 228 can generate a unicast stream from the multicast TS, without performing decryption. The decrypted local unicast stream is then processed, in parallel, by three different applications: a transcoder 230, a frame grabber 232, and a metadata extractor 234. By performing decryption on the computing device and generating a decrypted local unicast stream that is only seen by the computing device itself, the decrypted information is not exposed to other devices.

The transcoder 230 performs a transcoding process to convert the unicast stream generated by the decryption and local streaming engine 228 to a protocol that is supported by the browser 206. For instance, the protocol can be the protocol that can be used to render and display media content (e.g., video and/or audio content) using the media player 204 on the browser 206. In some examples, the browser 206 can support multiple protocols, such as AVC (H.264) with an fMP4 data structure, MPEG-1, HLS, SST, Flash, or any other suitable format. When needed, the transcoder 230 can transcode the unicast stream to any of these formats. When the unicast stream is already in a format that is supported by the browser 206, the transcoding processes can not be applied, and can be sent to the data and stream relay 260. For instance, transcoding may only occur if the incoming video is not already using a format that can be processed as needed for rendering and/or display by the media player 304 (e.g., a HTML5 player). In one illustrative example of a transcoding process, the transcoder 230 can perform a RAM-based transformation (performed in the RAM) of the original video and audio to an AVC (H.264) format with an fMP4 data structure. For instance, if the incoming video is encoded using the HEVC (H.265) protocol, the transcoder 230 can decode the HEVC content, and can then re-encode the video content using the AVC (H.264) protocol to generate AVC content with an fMP4 data structure. In some cases, the transcoder 230 can also re-encode the audio content using an MPEG-1 L2 protocol or other suitable audio protocol. Among other advantages, the AVC protocol can be used because it provides an ability to scale to higher resolutions (e.g., 4K, 8K, or other resolution) properly and allows delivery of high quality latency results.

In another illustrative example, the transcoder 230 can perform a RAM-based transformation of the original video and audio to MPEG-1 video with MPEG-1 L2 audio. The MPEG-1 video can be in an MPEG-1 payload format, but can have features of other MPEG standards or other standards. For instance, the MPEG-1 video can have the MPEG-1 payload format, but can have a higher resolution than that defined by the MPEG-1 standard, such as high definition, 4K (or ultra-HD) resolution, or the like. In some cases, the MPEG-1 can be used because it can be provided in real time and does not require buffering, in contrast to HLS, Flash, and other Internet-oriented protocols that require buffering.

In other implementations, any suitable format can be used as the transcoding output. In some cases, the transcoded video does not include the metadata that was included in the TS.

In some cases, the transcoding process performed by the transcoder 230 can be used to alter the quality (e.g., a resolution change, a frame rate change, or both) based on the techniques described below for optimizing CPU and RAM utilization.

The frame grabber 232 performs frame grabbing to yield individual high-quality frames from the one or more unicast streams. In certain cases, instead of rendering and displaying the transcoded video and audio of a received TS, the media player 204 can render and display the high-quality frames stored by the frame grabber 232 (after being decoded by the media player 204). For example, as described in further detail below with respect to FIG. 6, FIG. 7, and FIG. 8, only the high-quality video frames (e.g., with no audio being rendered) of the unicast stream may be displayed for video panes that are not active or not in focus. In such cases, the full unicast TS (with video and audio and in some cases with metadata) is not displayed for the video panes that are not active.

The metadata extractor 234 performs metadata extraction to extract the metadata from the one or more unicast streams. For example, the metadata extractor 234 can be programmed to recognize which payload (e.g., from one or more packets) from the bitstream of a unicast TS include metadata, and can extract the relevant payload. The metadata is extracted because, in some cases, it may not be possible or it may not be desired to embed the metadata with the video content when the unicast TS is sent to the upper layer of the browser 206. The metadata extraction thus ensures that metadata from the one or more original multicast TSs is not lost or omitted. The extracted metadata can later be rejoined with the video and/or audio when the video and/audio is being rendered. For example, the extracted metadata can be used by the media player 204 to display synchronous playback of video and metadata. By extracting the metadata, and then rejoining the metadata with the video and/or audio later in the processing pipeline, the metadata can be displayed with the video at any position on a display (e.g., as an overlay over the video, in a separate window outside of a window displaying the video, or other suitable position or configuration). Extracting and rejoining the metadata also allows only certain portions of the metadata to be selected for viewing with the video content. For instance, a user may select which metadata to display with a given portion of a video.

In one or more of the transcoding, the frame grabbing, and metadata extraction processes, time stamping can be performed by the time stamper 238 of the multicast processing system 208 of the computing device. For example, the time stamper 238 can apply time stamps to the audio packets, the video packets, and the metadata packets. Any suitable time stamping can be used. For example, a network clock (e.g., that is used for all devices on a network) can be used to determine the time that applies to each packet. In some cases, there are one or more rows of a video frame with pixel locations that are invisible when displayed (e.g., they are not part of the visible part of the frame, or the like). In such cases, one or more pixel values can be added to the frame in such pixel locations, which can be used to indicate a timestamp for each frame. A similar process can be performed for audio and metadata packets. It can be crucial to accurately synchronize the different video, audio, and/or metadata data. For instance, in a drone application capturing video of an environment, it can be important that location coordinate information (e.g., GPS coordinates) included in the metadata is accurately synchronized with the correct video frames so that the correct locations within the environment are identified.

The transcoded unicast stream (e.g., video and audio) can then be picked up on a local Hypertext Transfer Protocol (HTTP) port and piped by a run-time system 236 to a web sockets engine 240, which propagates the transcoded media to the upper browser layer. For instance, the run-time system 236 can convert HTTP traffic to web sockets traffic to provide the transcoded unicast stream (e.g., over one or more Transmission Control Protocol (TCP) channels) to the browser 206. In one illustrative example, the run-time system 236 can include a Node.js run-time environment that executes JavaScript code, or other suitable run-time system that executes other type of code. The run-time system 236 can be used to tunnel the video frames of the unicast stream (e.g., HEVC video frames, AVC video frames, MPEG1 video frames, or video having another suitable format based on the transcoding process) for rendering by the browser 206 (using the media player 204). For instance, the run-time system 236 (e.g., a Node.js run-time system) can receive a unicast stream from the transcoder 130, and can tunnel the unicast stream to a web socket in the web sockets engine 240 in order to provide the unicast stream to the browser 206 (and thus the media player 204). A web socket is a real-time (or near real-time) full duplex connection between two devices, applications, or other entities that can send data back and forth to one another, providing a persistent connection between the devices, applications, or the like that can pass through firewalls and proxies of the network. For instance, a web socket can provide a real-time, persistent connection between a browser and a back-end server (e.g., a web server). The web sockets engine 240, using web sockets, provides a way for the multicast processing system 208 and the browser 206 (and media player 204) to communicate with one another. For example, as noted above, the run-time system 236 can include a Node-js run-time environment. In such an example, the Node.js run-time environment is run in the multicast processing system 208 on the computing device, allowing the multicast processing system 208 to operate like a server in communication with the browser 206 using websockets.

In some examples, an artificial intelligence (AI) system 264 can be used for predicting the best transcoding settings for a given user. Further details of the AI system 264 are described below.

Figure 3:
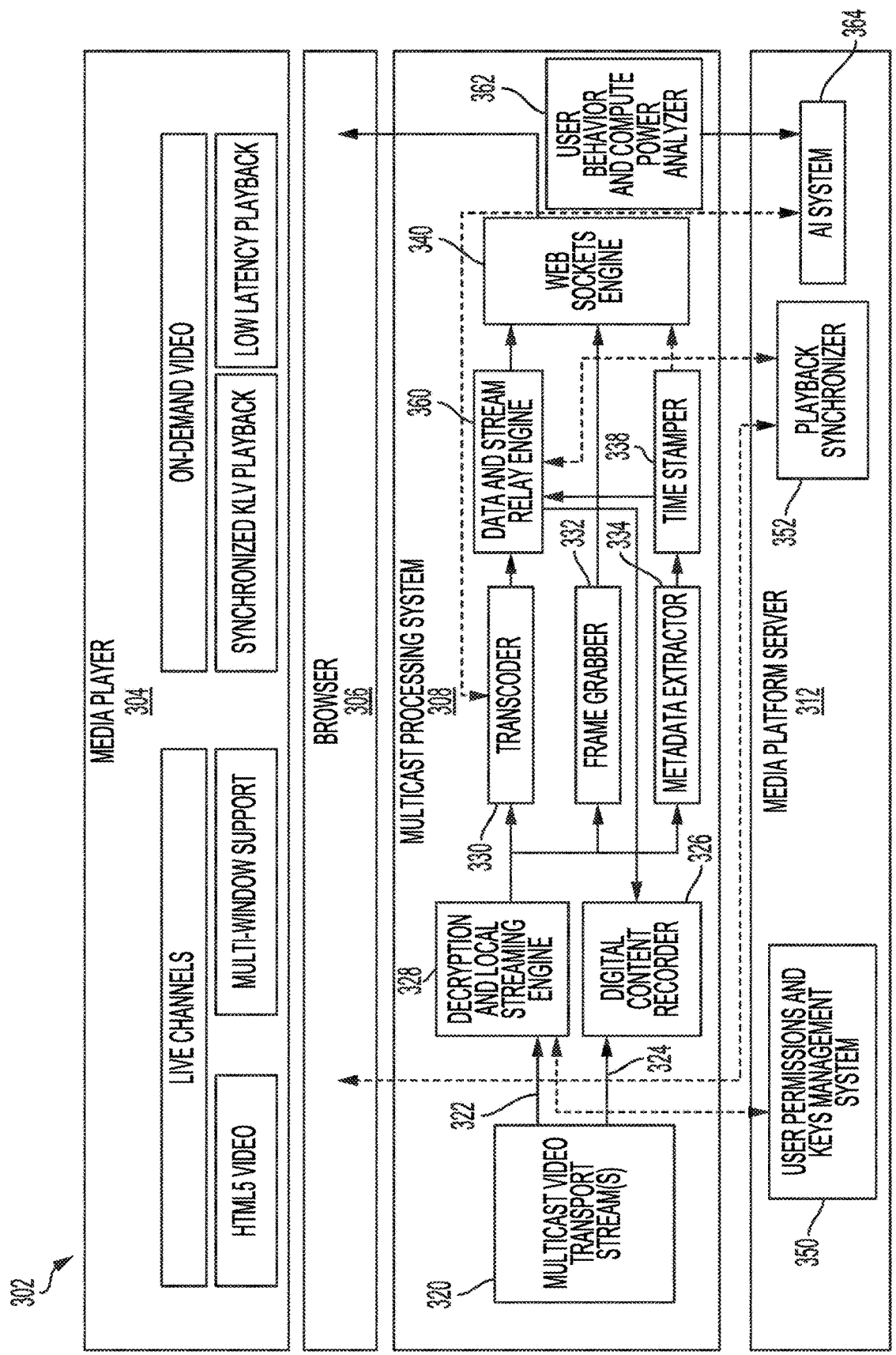
FIG. 3 is a block diagram showing another example of components used by a computing device for processing video content, in accordance with some examples.

FIG. 3 is a block diagram showing an example of components of a system 302 used by a computing device for processing multicast media content. The components of the system 302 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein. While the system 302 is shown to include certain components, one of ordinary skill will appreciate that the system 302 can include more or fewer components than those shown in FIG. 3.

The multicast processing system 308 can be a stand-alone software package that can be installed on a computing device and that can interact with one or more web browsers, media players (e.g., web players or other types of media players), operating systems, and/or other applications or programs installed on the computing device. In some cases, the multicast processing system 308 is platform agnostic, and thus can work with any type of computing device using any type of operating system, such as a computing device running a Macintosh™ operating system, a Windows™ operating system, a LINUX™ operating system, or any other operating system.

The system 302, using the multicast processing system 308, can implement the IGMP protocol (or other suitable protocol) to join any number of User Datagram Protocol (UDP) multicast Transport Streams (TS) requested by a given viewer through the computing device. For example, as shown in FIG. 3, the media content can be received as one or more multicast video transport streams 320. In one illustrative example, the one or more multicast video transport streams 320 can be MPEG transport streams (MPEG-TS) received via multicast UDP. While UDP MPEG transport streams are standard in many environments (e.g., video broadcasting, medical, military, among others), the one or more multicast video transport streams 320 can be in any other suitable transport stream-encapsulated video, such as HEVC (H.265), AVC (H.264), or other suitable video format transported using TS over UDP.

Each of the one or more multicast video transport streams 320 (each transport stream is referred to as a multicast TS) can include encrypted video and/or audio data (e.g., encrypted using AES or other suitable encryption method) and can also include metadata (e.g., KLV metadata or other suitable metadata). As described herein, the system 302 can handle any type of encryption, alleviating the problem that arises when a particular encryption standard (e.g., the AES encryption standard) is not supported natively in web browsers.

As shown in FIG. 3, two data paths are then created, including a first data path 322 and a second data path 324. Over the first data path 322, a multicast TS is sent to a digital content recorder 326, which can include a digital video recorder (DVR) or other suitable software, device, and/or component that can record the raw UDP TS to a file. For example, the original multicast TS payload of a multicast TS can be recorded in memory or storage, such as a local disk drive (e.g., when a recording (e.g., DVR) feature has been turned on). The multicast TS record stored in the memory retains the incoming video stream (and audio, if present) intact along with its encryption (e.g., AES encryption) and metadata (KLV/STANAG), if present in the TS.

The second data path 322 for the one or more multicast TSs is directed to a decryption and local streaming engine 328. In one illustrative example, the decryption and local streaming engine 328 can include an AES decryptor and local streamer. Any other type of encryption can be used in other examples. When the multicast TSs are encrypted, the decryption and local streaming engine 328 receives (from a user permissions and keys management system 350 of a media platform server 312) the needed decryption keys (e.g., AES keys if AES encryption is used, or other suitable encryption key for other encryption methods), and then performs real-time decryption (e.g., AES decryption if AES encryption is used, or other suitable decryption for other encryption methods) of the TS payloads. When the multicast TSs are not encrypted, the multicast TSs can be sent to memory (e.g., RAM or other storage or memory) and/or the transcoder.

The decrypted payload (or the clear payload for a transport stream that was not encrypted) can be accumulated in a memory buffer. The buffered data can be obtained (e.g., immediately or after a period of time) by the transcoder in the event the data needs to be transcoded). As described below, the buffered data (e.g., the transcoded data or the data in the original format if transcoding is not performed) can be obtained by the data and stream relay engine 360. The buffering process can continuously occur while the stream is being played. For example, the buffer can continuously be filled up and emptied as the media is received and processed by the data and stream relay engine 360. The decrypted or original stream can also be processed (e.g., in parallel) by a frame grabber 332 and a metadata extractor 334.

The transcoder 330 performs a transcoding process to convert the video data of the received transport stream to a protocol that is supported by the browser 306. For instance, the protocol can be the protocol that can be used to render and display media content (e.g., video and/or audio content) using the media player 304 on the browser 306. In some examples, the browser 306 can support multiple protocols, such as AVC (H.264) with an fMP4 data structure which can be played by an HTML5 media player or other suitable media player. When needed, the transcoder 330 can transcode the transport stream to any of these formats. When the transport stream is already in a format that is supported by the browser 306, the transcoding processes is not applied, and can be sent to the data and stream relay 360. For instance, transcoding may only occur if the incoming video is not already using a format that can be processed as needed for rendering and/or display by the media player 304 (e.g., a HTML5 player). In one illustrative example of a transcoding process, the transcoder 330 can perform a RAM-based transformation (performed in the RAM) of the original video and audio to an AVC (H.264) format with an fMP4 data structure. For instance, if the incoming video is encoded using the HEVC (H.265) protocol, the transcoder 330 can decode the HEVC content, and can then re-encode the video content using the AVC (H.264) protocol to generate AVC content with an fMP4 data structure. In some cases, the transcoder 330 can also re-encode the audio content using an MPEG-1 L2 protocol or other suitable audio protocol.

In other implementations, any suitable format can be used as the transcoding output. In some cases, the transcoded video does not include the metadata that was included in the TS.

In some cases, the transcoding process performed by the transcoder 230 can be used to alter the quality (e.g., a resolution change, a frame rate change, or both) based on the techniques described below for optimizing CPU and RAM utilization.

The frame grabber 332 performs frame grabbing to yield individual high-quality frames from the one or more transport streams. In certain cases, instead of rendering and displaying the transcoded video and audio of a received TS, the media player 304 can render and display the high-quality frames stored by the frame grabber 332 (after being decoded by the media player 304). For example, as described in further detail below with respect to FIG. 6, FIG. 7, and FIG. 8, only the high-quality video frames (e.g., with no audio being rendered) of the transport stream may be displayed for video panes that are not active or not in focus. In such cases, the video and audio of the full transport stream (and in some cases with metadata) is not displayed for the video panes that are not active.

The metadata extractor 334 performs metadata extraction to extract the metadata from the one or more transport streams (TSs). For example, the metadata extractor 334 can be programmed to recognize which payload (e.g., from one or more packets) from the bitstream of a TS includes metadata, and can extract the relevant payload. The metadata is extracted because, in some cases, it may not be possible or it may not be desired to embed the metadata with the video content when the TS is sent to the upper layer of the browser 306. The metadata extraction thus ensures that metadata from the one or more original multicast TSs is not lost or omitted. The extracted metadata can later be rejoined with the video and/or audio when the video and/audio is being rendered. For example, the extracted metadata can be used by the media player3 to display synchronous playback of video and metadata. By extracting the metadata, and then rejoining the metadata with the video and/or audio later in the processing pipeline, the metadata can be displayed with the video at any position on a display (e.g., as an overlay over the video, in a separate window outside of a window displaying the video, or other suitable position or configuration). Extracting and rejoining the metadata also allows only certain portions of the metadata to be selected for viewing with the video content. For instance, a user may select which metadata to display with a given portion of a video.

In one or more of the transcoding, the frame grabbing, and metadata extraction processes, time stamping can be performed by the time stamper 338 of the multicast processing system 308 of the computing device. For example, the time stamper 338 can apply time stamps to the audio packets, the video packets, and the metadata packets. Any suitable time stamping can be used. For example, a network clock (e.g., that is used for all devices on a network) can be used to determine the time that applies to each packet. In some cases, there are one or more rows of a video frame with pixel locations that are invisible when displayed (e.g., they are not part of the visible part of the frame, or the like). In such cases, one or more pixel values can be added to the frame in such pixel locations, which can be used to indicate a timestamp for each frame. A similar process can be performed for audio and metadata packets. As described above, accurately synchronizing the different video, audio, and/or metadata data can be a crucial process, such as in surgical applications, vehicle navigation, among other applications.

After the transcoding process is performed by the transcoder 330 (or when transcoding is not needed, such as when media is received that is already in a format supported by the browser 306), the data and stream relay engine 360 can receive the transport stream and can generate small chunks of media data from the transportstream. The chunks can be generated using any suitable format, such as an fMP4 format. For example, the data and stream relay engine 360 can include a data chunker, such as an fMP4 chunker, that can divide the data of the transportstream into smaller chunks of data. The chunks of data can also be referred to as data fragments. The chunks can then be sent through one or more websockets by the web sockets engine 340 to the browser 306. For example, regardless of the format of video that comes in (unless already in the AVC format), the transcoder 330 can transcode the video to AVC (H.264) video, and the data and stream relay engine 360 can generate the chunks of video using an fMP4 format that can then be delivered to the browser. While AVC is used as one illustrative example, the transcoder 330 can transcode the video into any suitable video and/or image format.

As noted above, the data and stream relay engine 360 can include a data chunker (e.g., an fMP4 chunker). The data chunker can take the transcoded audio, video, and metadata (e.g., after the metadata is extracted and time stamped) and can create the chunks of data (or data fragments) that will be sent via web sockets to the browser 306. In some cases, the data and stream relay engine 360 can also encrypt the chunks of data (e.g., using AES or other suitable encryption technology). For example, although the data chunks are available only to the local computing device, the data can still be encrypted as it passes from RAM via web sockets to the browser 306, in order to provide a higher level of security and to prevent any third party application to potentially sniff and/or intercept the data.

In one illustrative example, as noted above, the data chunker of the data and stream relay engine 360 can create fMP4 fragments (or chunks) from incoming video data (e.g., one or more multicast UDP Transport Streams or other video data). For example, a fragmenter process of the data and stream relay engine 360 can receive, as input, one or more MPEG Transport Streams (TSs) that are delivered (e.g., streamed) using multicast UDP protocol. An MPEG TS is a standardized digital container format used for transmission and storage of audio, video, and Program and System Information Protocol (PSIP) data. An MPEG TS can be used in broadcast systems, such as Internet Protocol television (IPTV), Digital Video Broadcasting (DVB), Advanced Television Systems Committee (ATSC), among others. A TS specifies a container format encapsulating packetized elementary streams, with error correction and synchronization pattern features for maintaining transmission integrity when the communication channel carrying the stream is degraded.

The fragmenter process of the data and stream relay engine 360 can join a multicast session using an IGMP "join" command and first scans the various programs available in the streams. Programs can be of one or multiple types, such as video, audio, metadata, and/or other ancillary information, such as closed captioning.

As described herein, transcoding may be performed due to incompatible source stream format, due to the user behavior and compute power analyzer 362 and/or AI system 364 indicating a different resolution, frame-rate, and/or bit-rate (e.g., a combination of resolution, frame-rate, and bit-rate) is more optimal for using with this specific user or computing device, and/or due to other factors. If transcoding is needed, a transcoding instruction is given to the multicast processing system 308 (e.g., to the transcoder 330) to perform the needed transcoding work before the data flows into the fragmentation pipeline of the data and stream relay engine 360. In some cases, the transcoding instruction can be given by the media platform server 312.

Once the correct set of video, audio, and/or metadata programs have been identified and have been determined to be in the desired format, the data and stream relay engine 360 performs real-time (e.g., as the data is received) deconstruction of the multiplexed UDP payloads and creates the following:

1. fMP4 payload(s)—Initialization segment including the boxes ftyp (File Type Box)+moov (Movie Box).
2. fMP4 payload(s)—Data segments including pairs of moof box (Movie Fragment Box)+mdat box (Media Data Box)
3. The system payloads ancillary metadata, such as KLV, STANAG, and/or closed captioning data, among others. For example, the decryption and local streaming engine 328 or the data and stream relay engine 360 can extract the metadata in real-time (e.g., as the data is received) from the original source stream and can code the metadata into proprietary, frame-accurate, tagged payloads that the media player 304 (e.g., browser player or other suitable media player) can effectively display and align to video frames, as described herein.

Figure 4:
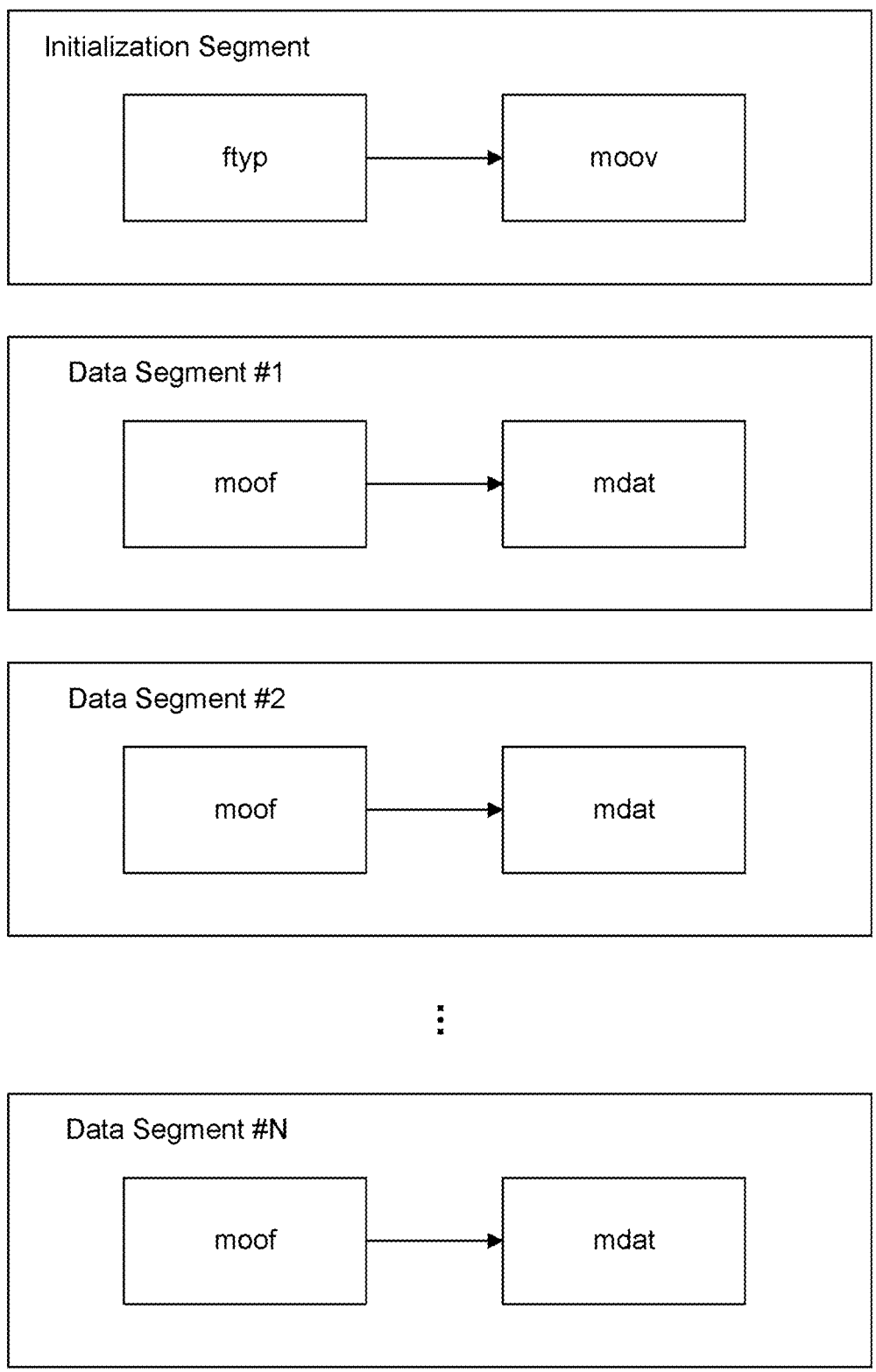
FIG. 4 is a conceptual diagram showing different payload diagrams of a transport stream, in accordance with some examples.

FIG. 4 is a diagram illustrating an example of an initialization segment with a ftyp box and a moov box, and multiple data segments including respective moof boxes and mdat boxes. A ftyp box is typically placed as early as possible in a media file, and identifies a file format specification that is the most suitable (e.g., referred to as the major brand) for parsing the file. For example, media file may have been formatted according to a particular file format specification, but may be compatible with other iterations of the specification. In some examples, a player device can use the major brand to determine whether the device is capable of decoding and displaying the contents of the file. In some example, the type and/or version of the operating system (OS) of the device, the type and/or version of a web browser used by the device, or any combination thereof can be used to determine whether the device is capable of decoding and displaying the contents of the file. For instance, such examples can be beneficial due to different OS-browser combinations supporting different formats. The ftyp can also include a version number, which can be used to indicate a version of the file format specification. In some cases, the ftyp box can include a list of compatible brands, which are others brands with which the file is compatible. In some implementations, a media file only includes only one ftyp box.

The moov box can include a movie header box, and can include one or more track boxes, as well as other boxes. In some cases, a presentation, whether contained in one file or multiple files, can include only one movie box (moov). The movie header box ("mvhd") can include information that is media-independent and relevant to the presentation as a whole. For example, the mvhd box can include information such as a creation time, a modification time, a timescale, and/or a duration for the presentation, among other information. The mvhd box can also include an identifier that identifies the next track in the presentation. A track box ("trak") can contain the information for a track for a presentation. A presentation can include one or more tracks, where each track is independent of other tracks in the presentation. Each track can include the temporal and spatial information that is specific to the content in the track, and each track can be associated with a media box. In some cases, a track header box ("tkhd") can specify the characteristics of a track contained in the track box, such as, for example, a creation time, modification time, duration, track identifier, layer identifier, group identifier, volume, width, and/or height of the track, among other things. A track box can include other suitable boxes not described herein.

A movie fragment box ("moof") can extend a presentation by including additional information that would otherwise be stored in the movie box. Using moof boxes, a presentation can be built incrementally. A moof box can include a movie fragment header box and one or more track fragment boxes ("traf"), as well as other boxes not described herein. The movie fragment header box ("mfhd") can include a sequence number. A player device can use the sequence number to verify that the particular fragment includes the next piece of data for the presentation. In some cases, the contents of a file, or the files for a presentation, can be provided to a player device out of order. For example, network packets can arrive in an order other than in the order that the packets were originally transmitted. In these cases, the sequence number can assist a player device in determining the correct order for fragments. A movie fragment box can include a set of track fragments (in one or more track fragment boxes "traf"), including zero or more per track. The track fragments can contain zero or more track runs, each of which describes a contiguous run of samples for a track. In some examples, track fragments can be used to add empty time to a track, in addition to adding samples to the track.

The media data box ("mdat") contains media data. In video tracks, for example, the mdat box can contain video frames, packets, access units, and/or other form of video data. A mdat box can alternatively or additionally include audio data. A presentation can include zero or more mdat boxes, which in some cases can be contained in one or more individual files. The media data is described by metadata. In one illustrative example, media data in an mdat box can be described by metadata included in a traf box. In other examples, the media data in an mdat box can be described by metadata in the moov box. In some examples, the metadata can refer to particular media data by an absolute offset within the file, such that a media data header and/or free space within the mdat box can be skipped.

Once the multiplexed UDP payloads have been deconstructed and the above-described data chunks and metadata are extracted and/or generated, the data and stream relay engine 360 can pack all the above fmp4 payloads (e.g., initialization segment and data segments) with the proprietary payloads (e.g., with the metadata, instructions for video sync and video overlay graphics) used for ensuing audio, video, metadata synchronization using time tagging and packet count tagging, and can send the packaged data to the browser application layer (e.g., the browser 306) using websockets (e.g., implemented by the web sockets engine 340).

The browser 360 can then process the packaged data (e.g., using JavaScript). For example, the browser 360 can separate the fMP4 data to display in HTML <video> tag using media source extensions (MSE). MSE is a World Wide Web Consortium (W3C) specification that allows JavaScript to send byte streams to media codecs within Web browsers that support HTML 5 video and audio. In one example, MSE allows the implementation of client-side prefetching and buffering code for streaming media entirely in JavaScript. MSE is used as an illustrative example. One of ordinary skill will appreciate that any other suitable specification can also be used. The browser 360 can takes the metadata (e.g., KLV and/or other metadata) and display the metadata on canvas using WebGL to overlay the metadata over the video content. WebGL is a JavaScript API for rendering interactive 2D and/or 3D graphics within a web browser without the use of plug-ins. In some cases, the browser 360 can take Web Video Text Tracks format (WebVTT) and manipulates the HTML <track> element attached to the <video> tag.

When the media player 304 is processing multiple video streams, the browser process described above can be performed for each stream in parallel. In some cases, in order to ensure the local user's machine CPU and RAM optimization during live decoding of multiple streams, the multicast processing system 308 can continuously or periodically communicate with the media platform server 312 to determine which streams will be transcoded to what quality (including resolution, frame rate, and/or bit rate), such that the user receives the highest quality for the active video and possibly lower quality on secondary video panes, until the focus is changed to another video stream which may take higher priority in terms of video quality over the other streams being decoded.

In some cases, as noted above, the received multicast content (e.g., a transport stream, such as an MPEG transport stream) can be recorded by the digital content recorder. In some cases, the digital content recorder 226 can record the chunks of data (e.g., the fMP4 chunks). In some implementations, the received multicast content and the chunks of data can be recorded. In other implementations, the received multicast content is not recorded when the chunks of data are recorded. Recording the chunks of data can provide the benefit of allowing a quick transition between live playback and recorded playback (e.g., in a DVR scenario, when pausing live television content and then fast forwarding from the paused position up to the live progress of the channel). The media player 304 and/or browser 306 player can access the stored chunks of data (e.g., MP4 chunks) and can seamlessly transition to the live chunks of data, as opposed to using the original raw multicast content that would require pre-processing (e.g., transcoding and chunking) before it can be played in the browser 306.

The web sockets engine 340 can send the chunks of media data (or data fragments) to the upper browser layer, which can include the transcoded media or non-transcoded media if transcoding is not needed. As described above, a web socket is a real-time (or near real-time) full duplex connection between two devices, applications, or other entities that can send data back and forth to one another, providing a persistent connection between the devices, applications, or the like that can pass through firewalls and proxies of the network. For instance, a web socket can provide a real-time, persistent connection between a browser and a back-end server (e.g., a web server). The web sockets engine 340, using web sockets, provides a way for the multicast processing system 308 and the browser 306 (and media player 304) to communicate with one another.

In some examples, an artificial intelligence (AI) system 364 can be used for predicting the best transcoding settings for a given user. Further details of the AI system 364 are described below.

In some cases, the multicast processing system (e.g., multicast processing system 208 and/or multicast processing system 308) can also report performance data to the playback synchronizer (e.g., playback synchronizer 252 and/or playback synchronizer 352) of the media platform server (e.g., media platform server 212 and/or media platform server 312). In some implementations, the multicast processing system 208 can use a full-duplex, proprietary, and secure communication protocol to report the performance data from the run-time system 236 to the playback synchronizer 252. For example, the multicast processing system 208 can report performance data from the run-time system 236 to the playback synchronizer 252. In another example, the multicast processing system 308 can report performance data from the data and stream relay 360 to the playback synchronizer 352. In some cases, a user behavior and compute power analyzer (e.g., user behavior and compute power analyzer 262 and/or user behavior and compute power analyzer 362) can provide compute power information to an AI system 264, as described in more detail below. The performance data can include information related to computing device and/or the media playback, such as CPU consumption, random access memory (RAM, which is memory of the local computer) usage, resources used by the media player (e.g., media player 204 and/or media player 304) and browser (e.g., browser 206 and/or browser 306) playing the video, video and audio payloads that are being sent to the Web sockets engine 240 and/or 340 (e.g., based on the time stamping information), how many video streams are being processed (e.g., at the same time), and/or other information. The performance data information can be used by the media platform server (e.g., media platform server 212 and/or media platform server 312) to perform one or more functions, such as to accelerate video rendering and playback on neighboring clients, to ensure synchronized playback (e.g., by the playback synchronizer) and possibly the elimination of any echo when the same video content is being played by computing devices being viewed by viewers seated close to one another, or other function. It is noted that the media platform server (e.g., media platform server 212 and/or media platform server 312) is not part of the system (e.g., system 202 and/or system 302), and can be remote from the computing device on which the system 202 and/or 302 is installed. In some cases, the media platform server can be implemented using one or more cloud computing devices or remote servers located remotely from the computing device.

The frames grabbed by the frame grabber (e.g., frame grabber 232 and/or frame grabber 332) can be sent directly to the Web sockets engine (e.g., Web sockets engine 240 and/or Web sockets engine 340), and can be propagated in real-time to the media player 204 and/or the media player 304 (e.g., executed by the browser 206 and/or 306) when needed. The media player can use these frames to create a full-motion video experience of one or more additional IP source streams the user chose to playback, but are not being used as the "active video" (or "focus video") that also includes active audio. Further details regarding an active video versus non-active videos in a mosaic view are described in more detail below.

In some cases, the CPU consumption, RAM usage, and/or resources used by the browser and/or media player playing the video can be used by the frame grabber (e.g., frame grabber 232 and/or frame grabber 332) to adjust the number of frames that are stored and/or to adjust the resolution of the frames. For example, the frame grabber can receive information that indicates an amount of CPU consumption of the computing device, an amount of RAM usage of the computing device, and/or an amount of resources used by the browser and/or media player for playing certain content. In some cases, the frame grabber can adjust a number of frames that are stored in response to the amount of CPU consumption, RAM usage, and/or amount of resources used by the browser. In some cases, the frame grabber can adjust a resolution of the frames in response to the amount of CPU consumption, RAM usage, and/or amount of resources used by the browser.

In one illustrative example, the number of frames that are stored can be decreased when the CPU consumption has exceeded a CPU consumption threshold (e.g., 70%, 80%, 90%, or other suitable amount), when the RAM usage has exceeded a RAM usage threshold (e.g., 70%, 80%, 90%, or other suitable amount), and/or when the amount of resources used by the browser exceed a resource usage threshold. In another illustrative example, the number of frames that are stored can be increased when the CPU consumption is below the CPU consumption threshold, when the RAM usage is below the RAM usage threshold, and/or when the amount of resources used by the browser is below the resource usage threshold. In another illustrative example, the number of frames that are stored can be decreased when the CPU consumption has increased by a certain amount (e.g., by more than 40%, 50%, or other suitable amount), when the RAM usage has increased by a certain amount (e.g., by more than 40%, 50%, or other suitable amount), and/or when the amount of resources used by the browser has increased by a certain amount (e.g., by more than 40%, 50%, or other suitable amount). In another illustrative example, the number of frames that are stored can be increased when the CPU consumption has decreased by a certain amount (e.g., by more than 40%, 50%, or other suitable amount) when the RAM usage has decreased by a certain amount (e.g., by more than 40%, 50%, or other suitable amount), and/or when the amount of resources used by the browser has decreased by a certain amount (e.g., by more than 40%, 50%, or other suitable amount).

As noted above, an artificial intelligence (AI) system (e.g., AI system 264 and/or 364) can be used for predicting the best transcoding settings for a given user. The AI system can be part of the media platform server 212. In some cases, the AI system can use machine learning to perform the operations described herein. For example, the AI system can include a neural network (e.g., a convolutional neural network or other suitable network) or other type of machine learning system. As described in more detail below, the AI system provides the ability to learn the user's patterns and playback environment, and to adjust the content accordingly. For example, the AI system can analyze behavior on a given computing device (e.g., a host computer) when playing a given channel (on its own or in parallel to additional channels being played in a multi-view mode of the media player, as described below). In some cases, the habits of a user can be tracked in terms of how many videos the user watches simultaneously (e.g., by which grid the user using the most). The AI system can take into account the screen resolution and average it over a period of time (e.g., a few hours, one or more days, etc. of use). Using such data, the AI system can predict a most likely way the user will invoke the media player (e.g., media player 204 and/or media player 304) at a future time, and can deliver to the browser (e.g., browser 206 and/or 306) video with optimized characteristics (e.g., at an optimized frame rate and/or resolution). For example, the optimized characteristics can be selected so that they will not compromise the viewing experience and so that CPU and/or RAM usage as saved (e.g., by not providing pixels that might not be needed since the user is watching a 3×3 grid and each video was originally 1920×1080).

The AI system can improve the inefficient and compromising experience traditional delivered by content providers (e.g., over-the-top (OTT) video streaming protocols). For instance, existing internet video streaming standards, such as HLS, HDS, MPEG-DASH, create multiple versions of a video by transcoding the original content to different quality streams. Each stream of the different quality can be referred to as a profile, and each profile can vary from other profiles in resolution, frame rate, bit rate, audio quality, any combination thereof, and/or other quality metrics. When a user wants to play a certain channel, the media player can select the lowest quality profile as possible, a profile with a quality in the middle of the available qualities, or other profile, and can being displaying the video associated with the selected profile. While this process has advantages, there are also problems associated with such a process. For example, the initial viewing experience can be compromised due to starting with a low profile, which can improve over time. For instance, over time (e.g., after 5-60 seconds), a traditional streaming player (e.g., OTT player) can detect if the network connection (e.g., Internet, cellular, or the like) is robust enough to allow use of more bandwidth, and if so, the player can switch to a higher quality profile. The player may continue to select higher quality profiles, if the player detects more available bandwidth that can be used and if higher quality profiles are available. In some cases, a player can also downgrade quality if the bandwidth or network quality is degraded. Such an adaptive approach is useful for Internet applications (e.g., streaming content over the Internet), since an Internet connection varies when used at home or on the move on a mobile device.

Such a learning curve of traditional streaming media players, and the switching from a low profile to a higher quality profile, can happen every time a user changes to a new channel. Further, transcoder compute power for video processing may be extremely high in such situations because the transcoder needs to produce multiple profiles, even though not all of the profiles will be used. In some cases, the transcoder used for streaming applications can be in a cloud-based server (remote from the end user client device). Cloud-based transcoders can work for Internet streaming systems since the transcoding is done one time for all users, due to all users sharing the same profiles and each user accessing the profile they need on-demand (e.g., as an HTTP download). However, in the systems described above (e.g., system 202 and system 302) that include a multicast processing system (e.g., multicast processing system 208 and/or multicast processing system 308), the transcoder (e.g., transcoder 230 and/or 330) is in each computing device, in which case more efficiency is needed to avoid producing unneeded profiles and to thus reduce the amount of transcoding processing.

In a closed-network scenario (e.g., in an Enterprise network), the network bandwidth can be consistent without many changes (especially as compared to Internet services). In such cases, the factors impacting quality of service (QOS) and/or a computer's ability to properly display video is associated with other aspects of the environment. For example, such factors can include usage of the computer that will display the video due to other applications running in parallel (e.g., email applications, Internet browsers, etc.). Such usage can be usage of the CPU, RAM, graphics processing unit (GPU), and other resources of the computer. In other examples, the factors affecting QoS and the computer's ability to display video can include how many other videos are being played, what resolution of screen the specific computing device has (e.g., there is no reason to show an 1920×1080 HD video if the computing device has a 1920×1080 screen and is currently trying to view 16 videos in a multi-view grid, since all of the videos will need to be reduced in size to fit screen).

As described above, the systems 202 and 302 allow delivery of multicast content directly to a client computing device (of an end-user), instead of having content (e.g., data chunks) delivered from a server to each computing device (e.g., to avoid sending data to each computing device). Such a multicast approach is a more scalable way to deliver video (e.g., on enterprise networks, home networks, and/or other networks). The transcoding process can be used to optimize the quality of the video on each client computing device based on the factors described above. However, media players traditionally adapt video on-the-fly as the session progresses and as the player learns more about the environment.

The AI system described herein can use historic data (e.g., based on information from multicast processing system 208 and/or multicast processing system 308) to accurately predict the needed media format to be generated by the transcoder. For example, the multicast processing system 308 can collect data associated with video playback by a computing device, and can send the data to the media platform server 312. In some cases, the user behavior and compute power analyzer 362 can collect the data. The data collected by the multicast processing system 308 can include performance data of the playback computing device, the type of channels the user is watching, how the user views the videos, any combination thereof, and/or other data that can be used to predict a media format.

As noted above, the data collected by the multicast processing system (e.g., system 208 and/or system 308) can include performance data of the playback computing device. The performance data can include data relating to resources of the computing device. The resources can include the RAM, CPU, GPU, any combination thereof, or other suitable component of the computing device. The information can include how much of each resource is being used over time, the time or times at which a user uses the media player (e.g., media player 204 or 304) to view the content provided through the multicast processing system. Such information allows the AI system to learn the user's day-to-day habits as it relates to the computing device. In an enterprise environment for example, enterprise users can tend to run the same software in the background, use the same applications in parallel to watching video, among other habits, on a daily basis. The actual compute resources of a given user on a given computing device can be determined and analyzed as the different uses are performed. In some cases, the parameters of the different components of a computing device (e.g., amount of RAM, amount of CPU, and amount of GPU that the computing device has) can also be used.

The data collected by the multicast processing system (e.g., system 208 and/or system 308) can also include the type of channels the user is watching. For example, there can be many channels (e.g., hundreds of channels) in a channel lineup, but users may only view a subset of the full channel list. In one illustrative example, an enterprise network of a company can have hundreds of channels, and users with access to the enterprise network can access certain channels based on the users' function in the organization, based on the users' personal preferences, based on user permissions set by information technology personnel, among other factors.

The data collected by the multicast processing system (e.g., system 208 and/or system 308) can also include data indicating how users view in the media player (e.g., media player 204 and/or 304) the videos provided by the multicast processing system. For example, the data may indicate that users view videos one at a time, always in a quad grid (with four videos at a time), sometimes in quad grid and sometimes in a grid of 16, or in any other configuration. As another example, the data may indicate what screens are used by the users. Such screen type information can be highly useful because it is not desirable for the multicast processing system to deliver more pixels per video than the screen can even show natively, and it is also not desirable to deliver less pixels than that which can be displayed, which will result in interpolation by the graphics card.

Using the data collected by the multicast processing system (e.g., multicast processing system 208 and/or multicast processing system 308), the AI system (e.g., AI system 264 and/or AI system 364) can learn users' habits, the users' computing devices, and how the users view videos. The learned data can then be used by the AI system to determine a quality recommendation that indicates the quality that should be generated by the transcoder (e.g., transcoder 230 and/or transcoder 330) when processing the transport stream. The quality recommendation is specific to a given user and a given computing device. For example, the quality recommendation can indicate to the transcoder the quality to generate when a given channel is selected by a given user on a given computer. The AI system can send the quality recommendation to the transcoder of the multicast processing system (which resides and operates on each user computing device), and the transcoder can generate video having the quality specified by the quality recommendation when a given channel is selected by a given user on a given computer.

A goal of the AI system is to accurately predict the best settings possible for the transcoding process performed by the transcoder of the multicast processing system, such that from the start of the viewing session the user will get the best quality video possible (e.g., tailored to the computing device, the screen, and the user's viewing habits). The AI system can substantially reduce the learning curve of a local adaptive media player that does not have usage history data, can eliminate the need to create many profiles that may never be used, and can improve the viewing experience due to less switching and less CPU (and other resources) being used for unneeded transcoding steps.

Another advantage of the AI system described above is the ability to generate the predictions even in information technology (IT) environments where users move from one location to another. For example, in some organizations, military bases, government facilities, or the like, computing device workstations are not personal. In such cases, the workstations may be used by various users. Each individual user can be detected using an active directory username unique to each user and, unlike other solutions that have local player logic, the media platform server (e.g., server 212 and/or 312) can fetch the user's data (based on the active directory username) and provide quality recommendations regardless of which computer is being used. Data about each computing device on a given network (e.g., an enterprise network, home network, or other network) can also be known by the AI system. For example, a serial number or other unique identifier can be used to identify a computing device. The AI system can know how to match a user's data with the data unique to the computing device the user is currently using, The combination of the user data and computing device data allows the AI system to accurately predict best settings needed for any user using any machine.

Figure 5A:
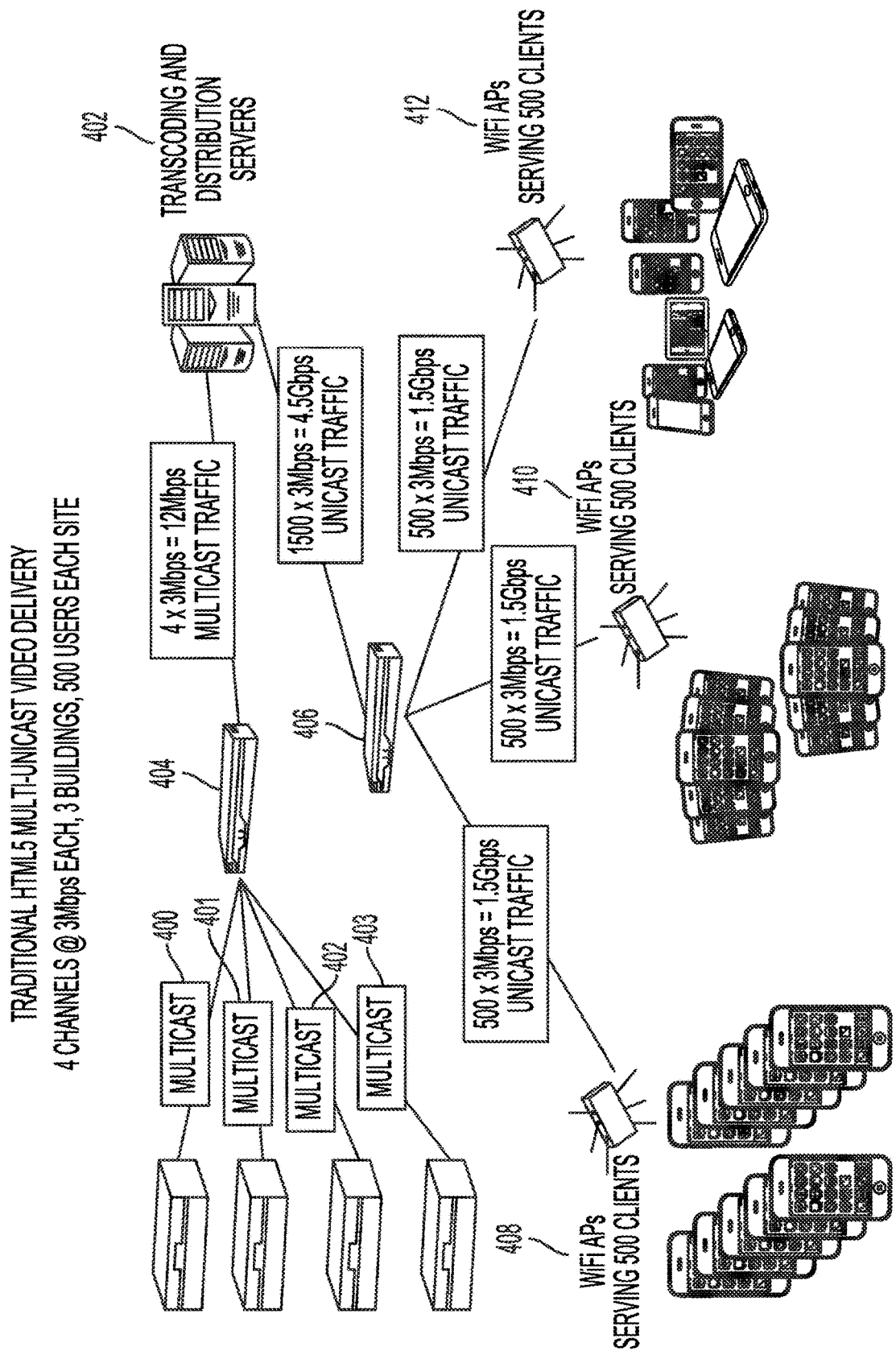
FIG. 5A is a diagram showing an example of a multi-unicast video delivery system.
Figure 5B:
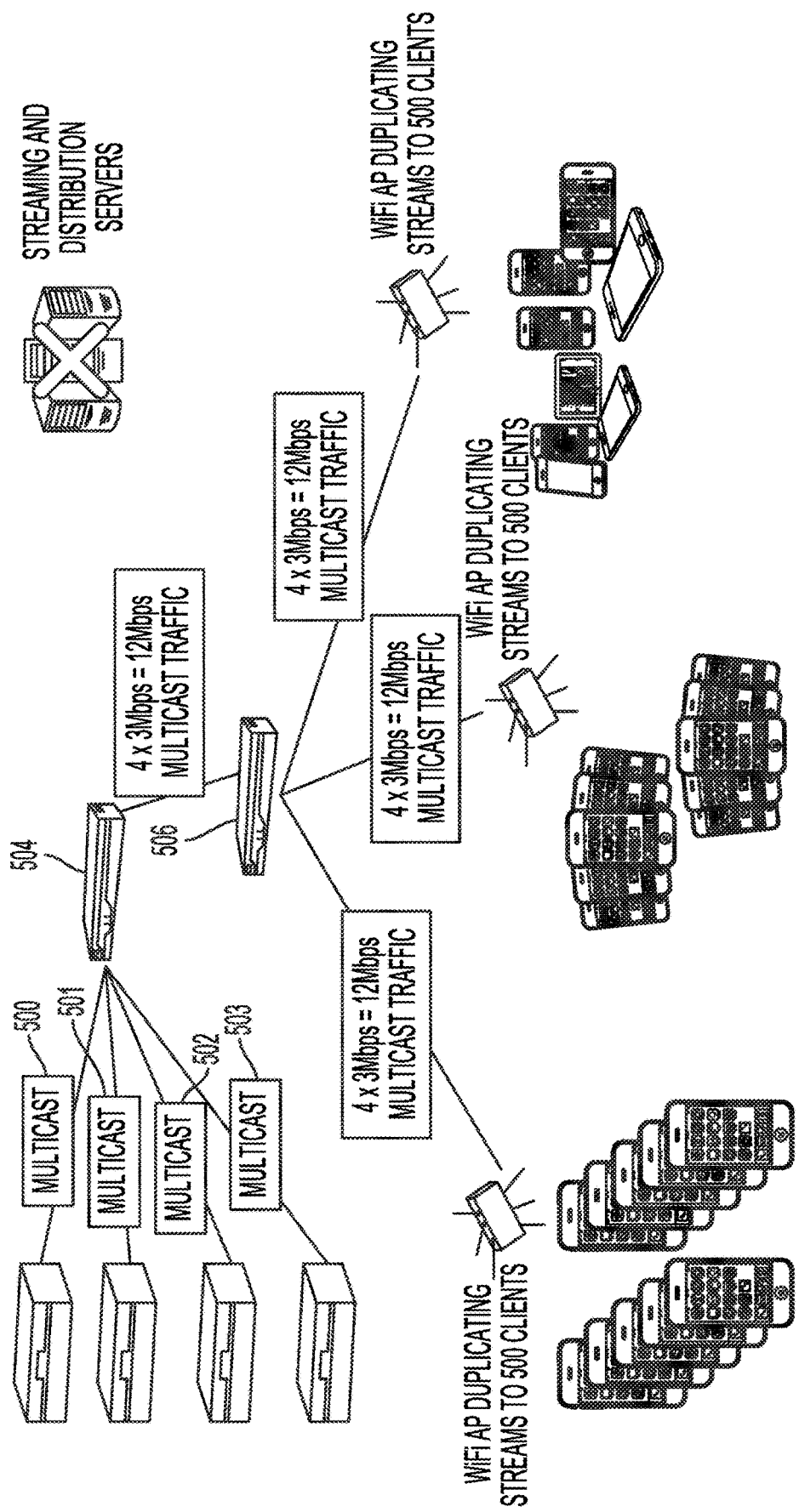
FIG. 5B is a diagram showing an example of a multi-cast video delivery system, in accordance with some examples.

FIG. 5A is a diagram showing an example of a multi-unicast video delivery system (e.g., within an enterprise network) that provides traditional video delivery for plugin-less HLS, Flash, HTML5, or other suitable enterprise solutions. FIG. 5B is a diagram showing an example of a multi-cast video delivery system (e.g., within an enterprise network) that utilizes the techniques disclosed herein (e.g., using a system such as system 202 or system 302) to provide multicast delivery with playback using any suitable protocol (e.g., HTML5 or other protocol). The components of the systems shown in FIG. 5A and FIG. 5B can be located within a single location (e.g., a server room of a building or the like), or can be distributed in different locations.

For both the systems shown in FIG. 5A and FIG. 5B, an example of video consumption is used, where four unique multicast video channels (including video channels 400, 401, 402, and 403 and video channels 500, 501, 502, and 503) are provided at 3 megabits per second (Mbps) each. The systems shown in FIG. 5A and FIG. 5B can each include a multi-site enterprise network that serves four locations with 500 users in each location. The different sets of 500 end user clients can be present in different locations, such as buildings, venues, or other suitable locations. As shown in FIG. 5A and FIG. 5B, the multicast content can be provided to the core network switch 504 from four sources, which can include any suitable content source. Illustrative examples of content sources include a local TV channel feed, a satellite TV channel, a cable TV content provider (e.g., Comcast™, TimeWarner™, DirecTV™, or the like), or other suitable source. One of ordinary skill will appreciate that more or fewer content sources than those shown in FIG. 5A and FIG. 5B can be included. For illustrative purposes, it can be assumed in both FIG. 5A and FIG. 5B that each user is consuming/viewing one or more of these channels (e.g., displaying all four channels in a mosaic view, displaying one or more of the channels while recording one or more of the other channels, viewing a single channel on a desktop/laptop player, or other suitable configuration).

As shown, the multi-unicast system shown in FIG. 5A requires the use of one or more transcoding and distribution servers 402 to receive the multicast traffic from a first network switch 404, transcode the content into an internet stream format natively supported by typical operating systems and/or browsers and distributing this content as individual unicast streams, with a total of a minimum of 1500 unicast streams (one per user). As noted above, each multicast stream is at 3 Mbps, requiring a total of 4.5 gigabits per second (Gbps) for all 1500 unicast streams. A second switch 406 then distributes the streams to the appropriate locations, with 500 streams going to three different edge network switches (APs) 408, 410, 412 that each serve 500 end user client computing devices. In some cases, instead of or in addition to wireless (e.g., WiFI) Aps, physical network switches can be used when the system of FIG. is implemented in a local area network (e.g., an enterprise network). While only two switches 404 and 406 are shown in FIG. 5A, one of ordinary skill will appreciate that more network switches can be included in the network.

A multi-unicast system, such as that shown in FIG. 5A, requires an investment in a large amount of hardware infrastructure because servers are needed to take the four individual content streams that are being multicasted and to redistribute them as separate individual unicast copies for every computing device that requests the streams. For example, entities that have a large number of content channels and a vast amount of computing devices consuming the content on their network, with each computing device being able to watch and/or record multiple videos at the same time, may need to spend tens of millions of dollars on network infrastructure to perform the transcoding and routing functions for the multi-unicast approach. The transcoding and routing functions of the transcoding and distribution servers 402 also add latency to the system, as discussed above. As also discussed above, failure of the transcoding and distribution servers 402 (e.g., during the transcoding process) will negatively impact the quality of service of the video delivery solution because the transcoding is performed for multiple computing devices, and failure of the transcoding and distribution servers 402 can affect all of the computing devices.

The use of a multi-unicast system, such as that shown in FIG. 5A, is due to browser based media players (or web players) traditionally being used only for Internet-based video, and Internet-based systems not supporting multicast video based on the infrastructure of such Internet-based systems (e.g., the routers and switches in Internet infrastructures).

The multicast system shown in FIG. 5B is superior in many ways as compared to the multi-unicast system shown in FIG. 5A, due to the use of the system 102 (e.g., system 202 shown in FIG. 2 or system 302 shown in FIG. 3) being deployed in each of the end user client computing devices. For example, the multicast system shown in FIG. 5B eliminates costly servers (including hardware and/or software) for transcoding and duplication of the video streams, such as the transcoding and distribution servers 402 shown in FIG. 5A. Further, the multicast system features much lower playback latency (delay) due to the fact that delivery to the client computers is done using real-time transport streams (e.g., HEVC streams, AVC streams, MPEG streams, or other format), in which case buffering and/or caching (e.g., to an Internet-oriented protocol) is not needed before providing the content to the computing devices. For instance, the transport streams are received at the computing device and then transcoding is performed on the transport streams at the computing device itself, only when needed based on the individual performance, computational power, capabilities and health state of the at computing device eliminating the need to compromise playback latency and quality of service collectively to all users. In some cases, buffering can be added, such as for computing devices receiving the multicast transport streams over a wireless connection, but the buffering can be dynamically adjusted and optimized (e.g., to include 500 milliseconds, 1000 milliseconds, or other small amount of time) so that minimal latency is experienced by the user. Because the buffering would be implemented by the computing device, each computing device can decide when to implement buffering (e.g., when a wireless network connection is being used) and when not to implement buffering (e.g., when a wired network connection is being used).

The multicast system also delivers the same amount of streams across the network to all users using 125 times less bandwidth. For example, as shown in FIG. 5B, the same four multicast content streams are provided to the last hop of the network (e.g., the access points), so that there is only 12 Mbps (4 streams×3 Mbps) of bandwidth utilization every step of the way. Such a reduction in bandwidth is because, with multicasting, every computing device that requests a content stream (e.g., a television channel or the like) joins the same bitstream, allowing the network routers and switches to handle join and leave requests using the efficient IGMP protocol. For instance, a separate unicast copy of the bitstream is not needed in multicast, so that instead of having 1500 different bitstreams (like with the system in FIG. 5A), only four bitstreams are needed, resulting in 12 Mbps utilization compared to 1.5 Gbps. The multicast system shown in FIG. 5B also limits the effect due to a point of failure in the transcoding and redistribution process or other process performed by the multicast processing system (e.g., multicast processing system 108, multicast processing system 208, and/or multicast processing system 308). For example, if the multicast processing system (e.g., system 108, 208, or 308) fails during one or more of the processes performed by the system, the failure will only effect the device on which the multicast processing system is installed, as opposed to an entire group of computing devices that are effected when the transcoding and distribution servers 402 (of FIG. 5A) fail.

As shown in FIG. 5B, the network switch 504 can receive the multicast traffic from the four content sources, and can route the multicast traffic to the network switch 506 (or router). While a network switch 506 is described, other network gateway devices can be used, such as routers or other devices. The network switch 506 can route the multicast traffic to the access points, which can wirelessly route the multicast traffic to each computing device. In some cases, the multicast traffic can be routed to one or more of the computing devices over a wired connection. While only two switches 504 and 506 are shown in FIG. 5B, one of ordinary skill will appreciate that more network switches can be included in the network depending on the network traffic and how many network ports are needed for a given network environment. For example, if the system shown in FIG. 5B is implemented in a large venue (e.g., an arena, a hospital, or other suitable venue), there can be 500 or more network switches for routing the multicast traffic throughout the network.

Even further, by using the system 202 or the system 302 in each computing device, an IGMPv3 protocol that allows source-specific multicasting (SSM) can be used by each computing device, which is not available using a server-based multi-unicast system, such as that shown in FIG. 5A. For example, the SSM allows delivery of multicast packets in which the packets that are delivered to a computing device are only the packets originating from a specific source address (e.g., an IP address) that is specifically requested by the computing device. Selecting the source from which content can be received, SSM improves security and reduces demands on the network. Using a server based multi-unicast system, the different client devices cannot request content from only certain source addresses, instead they are provided a unicast copy of the same multicast source the transcoding and redistribution server is subscribed to. Using a multicast system 202 or 302 run on each computing device, each of the computing devices can specify which source addresses are approved sources of content. This allows for better flexibility in selecting a multicast group while also protecting against denial of service attacks; hosts will only receive traffic from explicitly requested sources and multiple sources can offer the same multicast group without conflicts.

Based on the use of a system 202 or a system 302 in each computing device, the computing devices can still use a browser-based media player implemented using a desired protocol (e.g., an HTML5 protocol) and without the need for a plugin, but there is no need to modify the efficient, IGMP-based distribution of video on the network side just because a browser-based media player device does not support multicast.

In some examples, the systems 102, 202, and 302 shown in FIG. 1, FIG. 2, and FIG. 3 can support a multi-view experience (e.g., using mosaic grids on a display) on a plugin-less browser player (e.g., a plugin-less HTML5 browser player or other suitable player) or other media player with quick, CPU efficient transitions between video panes.

There are several challenges associated with acquiring multiple high quality streams (e.g., HD streams, 4K streams, or the like), playing them back simultaneously on a given computer using a browser, and being able to gracefully switch (without noticeable delay) from one active video to another and with audio always in sync with the video. For example, 1080p HD streams in broadcast quality typically use 4-30 Mbps of MPEG payload. When consuming multiple of these video streams to populate a mosaic grid display (e.g., a 2×2 mosaic grid, a 3×3 mosaic grid, a 4×4 mosaic grid, or larger), many video streams (e.g., 16 streams for a 4×4 grid) are received on a given computing device. In order to present these video streams using a browser player with no plugin, transcoding to a video format natively supported by the browser must occur. In some cases, the transcoding could be performed by a server with some traditional applications (e.g., the multi-unicast system shown in FIG. 5A), requiring it to be delivered as unicast to each user. In some cases, the transcoding could be performed on the client computing device by its CPU and RAM, making this task computationally intensive and possibly having an adverse effect on other applications running on the same machine. Furthermore, when a browser player is processing so many video streams in parallel, the user experience with the browser is affected when needing to switch between one video to another in order to activate audio or in order to maximize viewing of a specific video.

Transcoding of up to 16 (or more) video streams in parallel on a typical corporate workstation may not only compromise the computer's performance, possibly affecting other applications, it can also simply not work in older computers, making it impossible for certain users to view the number of streams they wish to view in a mosaic grid.

The system 102 (e.g., implemented as system 202 and/or system 302) can perform smart blending of full motion video (e.g., MPEG video) playback of one media stream for an active video pane along with continuous display of video frames (from the frame grabber) of one or more other media streams in all other video panes that are not in focus (are not "active") within the mosaic grid. Such a solution provides the viewer the experience of a standard video playing in the non-active video panes that are not in focus. The smart blending approach provides a major advantage in the computational power required for generating the mosaic grid, since the frame grabbing can be done directly from the original video source without the need to transcode the video and propagate full video and audio to the browser layer.

Figure 6:
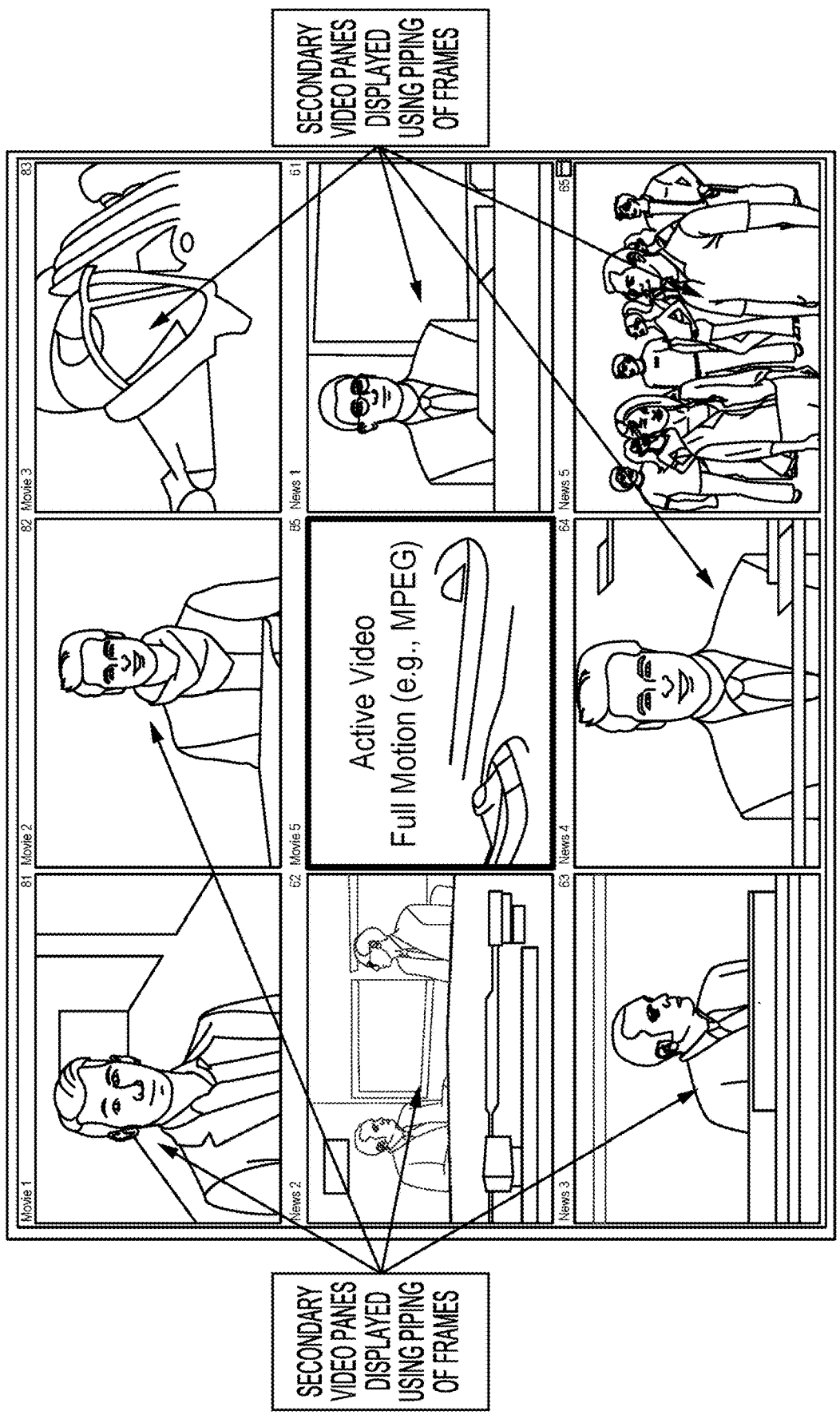
FIG. 6 is a picture illustrating an example display with a mosaic view of video streams, in accordance with some examples.
Figure 7:
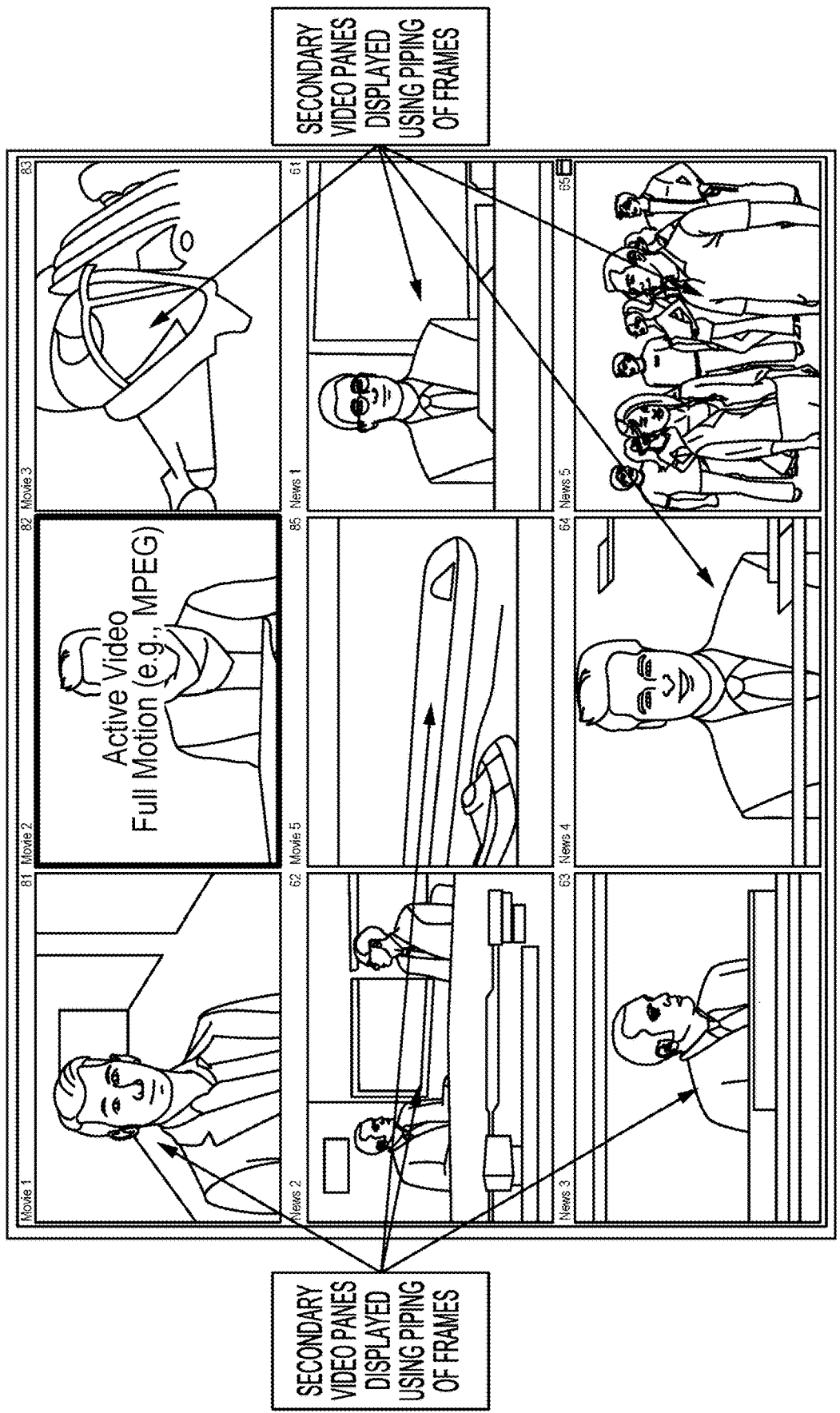
FIG. 7 is a picture illustrating another example display with the mosaic view of video streams, in accordance with some examples.
Figure 8:
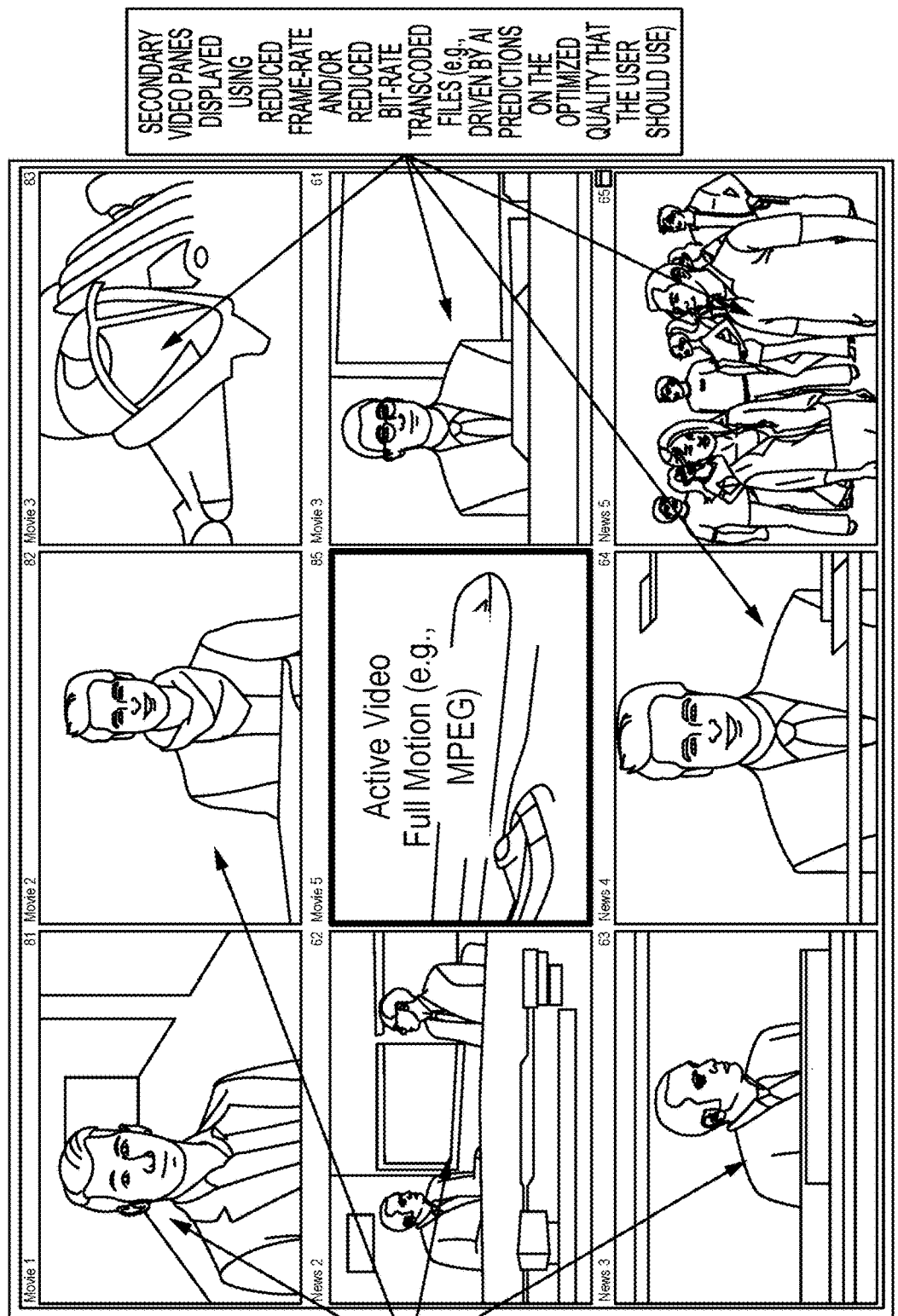
FIG. 8 is a picture illustrating another example display with the mosaic view of video streams, in accordance with some examples.

FIG. 6, FIG. 7, and FIG. 8 are pictures illustrating an example display with a mosaic view with a 3×3 grid of video streams. In the display shown in FIG. 6, the middle pane is the active video pane. A full motion video (e.g., a full motion MPEG video stream, HEVC video stream, AVC video stream, or other video) is presented for the video stream that is displayed in the active video pane, which includes both video and audio content. When transcoding is performed, the full motion video for the active video stream can be provided from the transcoder in the system 102 (e.g., implemented as system 202 and/or system 302) to the media player 104 and/or browser 106 in the system 102. For example, data chunks or full video packets can be sent to the browser 106 from the web sockets engine. The remaining video panes are the non-active video panes. The grabbed frames from the frame grabber are displayed (instead of the full motion video and audio content) by the player for the video streams that are displayed in the non-active video panes.

As shown in FIG. 7, a user has selected the top-middle video pane as the active video pane. When a user selects a different video pane to bring into focus as the active video pane, the system 102 seamlessly switches from displaying a frame-by-frame video-only representation of the video being displayed in the top-middle video pane to a full motion video stream (e.g., a full motion MPEG video stream, HEVC video stream, AVC video stream, or other video) with video and audio. The switch can be performed by the browser application instructing the multicast processing system (e.g., multicast processing system 108, multicast processing system 208, and/or multicast processing system 308) to change the processing mode for this given stream from the frame grabbed frames to the transcoded stream. Using the time stamping applied to each frame, the system 102 is able to perform the switch over from frame-based playback to full motion video (from the transcoder) playback smoothly without reloading and/or refreshing the player, which is typically required in other web-based video applications. For example, the video frame and audio frame with a common time stamp can begin to be displayed for the video stream corresponding to the newly active video pane.

In the display shown in FIG. 8, the middle pane is the active video pane. As described above, full motion video (e.g., a full motion MPEG video stream, HEVC video stream, AVC video stream, or other video) is presented for the video stream that is displayed in the active video pane, which includes both video and audio content. When transcoding is performed, the full motion video for the active video stream is provided from the transcoder in the system 102 (e.g., implemented as system 202 and/or system 302) to the media player 104 and/or browser 106 in the system 102. For example, data chunks or full video packets can be sent to the browser 106 from the web sockets engine. The remaining video panes are the non-active video panes. The grabbed frames from the frame grabber are displayed (instead of the full motion video and audio content) by the player for the video streams that are displayed in the non-active video panes. The secondary, non-active video panes can be displayed using reduced frame-rate and/or reduced bit-rate transcoded files (e.g., driven by AI system predictions of the optimized quality that the user should use).

Figure 9:
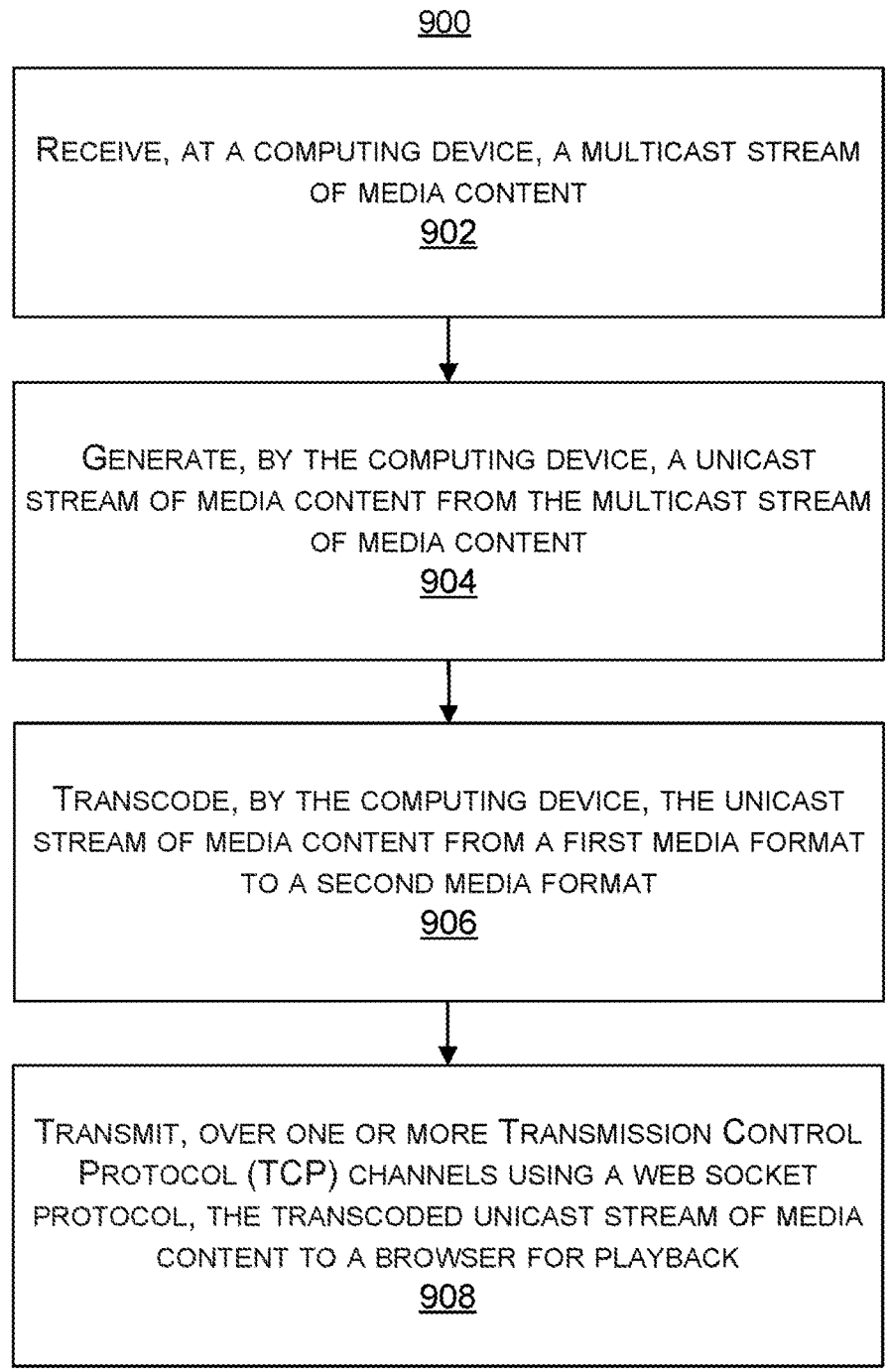
FIG. 9 is a flow diagram illustrating an example of a process for processing media data, in accordance with some examples.

One or more processes can be performed, implementing the techniques described above. FIG. 9 is a flow diagram illustrating an example of a process 900 for processing media data. At block 902, the process 900 includes receiving, at a computing device, a multicast stream of media content. The computing device can include an end-user computing device, such as a personal desktop or laptop computer, a mobile device (e.g., a mobile phone, tablet, wearable device, or the like), or any other suitable device that can include a browser and/or player that can display media content. In some cases, the media content includes video content and audio content.

At block 904, the process 900 includes generating, by the computing device, a unicast stream of media content from the multicast stream of media content. The unicast stream can be generated, for example, by the local streamer of the system 102 (e.g., implemented as system 202 shown in FIG. 2). At block 906, the process 900 includes transcoding, by the computing device, the unicast stream of media content from a first media format to a second media format. The transcoding can be performed, for example, by the transcoder of the system 102 (e.g., implemented as system 202 shown in and FIG. 2). At block 908, the process 900 includes transmitting, over one or more channels (e.g., over one or more TCP or other suitable channels using a web socket protocol), the transcoded unicast stream of media content to a browser of the computing device for playback. The browser is operated by the computing device, in which case the transmission is performed securely within the computing device (e.g., using websockets).

In some examples, a plugin is not used for generating the unicast stream of media content and for transcoding the unicast stream of media content. In some cases, the process 900 can include generating a request to receive the multicast stream of video, and transmitting the request to a video source, wherein the multicast stream of video is received in response to the request.

In some cases, the process 900 can further include receiving the transcoded unicast stream of media content on a local port (e.g., a local Hypertext Transfer Protocol (HTTP) port) of the computing device. In such cases, the transcoded unicast stream of media content is transmitted from the port to the browser using the web socket protocol.

In some cases, the process 900 can further include decrypting one or more payloads of the multicast stream of media content. For example, the decryption can be performed using one or more AES keys provided from a server (e.g., the media platform server 212 shown in FIG. 2).

In some cases, the process 900 can further include displaying, by the computing device, the transcoded unicast stream of media content using the browser.

In some cases, the process 900 can further include storing one or more video frames of the unicast stream of media content. For example, the one or more video frames can be stored by the frame grabber of the system 202 shown in FIG. 2. In some examples, the stored one or more video frames of the unicast stream of media content are not transcoded. The process 900 can include displaying, by the computing device, the stored one or more video frames using the browser.

In some cases, the process 900 can include receiving, at the computing device, an additional multicast stream of media content. In such cases, the process 900 includes generating, by the computing device, an additional unicast stream of media content from the an additional multicast stream of media content, and storing one or more video frames of the additional unicast stream of media content. In such cases, the process 900 can further include displaying, by the computing device using the browser, the transcoded unicast stream of media content in a first portion of a display of the computing device, and displaying, by the computing device using the browser, the stored one or more video frames of the additional unicast stream of media content in a second portion of a display of the computing device. FIG. 6, FIG. 7, and FIG. 8 illustrate examples of such a scenario.

In some cases, the process 900 can further include receiving (by the computing device) information associated with an amount of CPU consumption of the computing device, and adjusting a number of frames from the unicast stream of media content that are stored in the memory. In such case, the number of frames can be adjusted in response to the information associated with the amount of CPU consumption. In some examples, the process 900 can include adjusting a resolution of one or more video frames in response to the information associated with the amount of CPU consumption. In some examples, the resolution can be adjusted without adjusting the frame rate at which the frames are stored and provided to the browser of the computing device for playback.

In one illustrative example, the process 900 can include decreasing the number of frames from the unicast stream of media content that are stored in the memory when the information associated with the amount of CPU consumption indicates the CPU consumption has exceeded a CPU consumption threshold. In another illustrative example, the process 900 can include increasing the number of frames from the unicast stream of media content that are stored in the memory when the information associated with the amount of CPU consumption indicates the CPU consumption is below a CPU consumption threshold. In another illustrative example, the process 900 can include decreasing the number of frames from the unicast stream of media content that are stored in the memory when the information associated with the amount of CPU consumption indicates the CPU consumption has increased. In another illustrative example, the process 900 can include increasing the number of frames from the unicast stream of media content that are stored in the memory when the information associated with the amount of CPU consumption indicates the CPU consumption has decreased.

In another illustrative example, the process 900 can include receiving information associated with an amount of random access memory (RAM) usage by the computing device, and adjusting a number of frames from the unicast stream of media content that are stored in the memory, wherein the number of frames are adjusted in response to the information associated with the amount of RAM usage. In another illustrative example, the process 900 can include, adjusting a resolution of the one or more video frames in response to the information associated with the amount of RAM usage. In some examples, the resolution can be adjusted without adjusting the frame rate at which the frames are stored and provided to the browser for playback.

In another illustrative example, the process 900 can include decreasing the number of frames from the unicast stream of media content that are stored in the memory when the information associated with the amount of RAM usage indicates the RAM usage has exceeded a RAM usage threshold. In another illustrative example, the process 900 can include increasing the number of frames from the unicast stream of media content that are stored in the memory when the information associated with the amount of RAM usage indicates the RAM usage is below a RAM usage threshold. In another illustrative example, the process 900 can include decreasing the number of frames from the unicast stream of media content that are stored in the memory when the information associated with the amount of RAM usage indicates the RAM usage has increased. In another illustrative example, the process 900 can include increasing the number of frames from the unicast stream of media content that are stored in the memory when the information associated with the amount of RAM usage indicates the RAM usage has decreased.

In another illustrative example, the process 900 can include receiving information associated with an amount of resources used by the browser, and adjusting a number of frames from the unicast stream of media content that are stored in the memory, wherein the number of frames are adjusted in response to the information associated with the amount of resources used by the browser. In another illustrative example, the process 900 can include adjusting a resolution of the one or more video frames in response to the information associated with the amount of resources used by the browser. In some examples, the resolution can be adjusted without adjusting the frame rate at which the frames are stored and provided to the browser for playback.

In another illustrative example, the process 900 can include decreasing the number of frames from the unicast stream of media content that are stored in the memory when the information associated with the amount of resources used by the browser indicates the amount of resources has exceeded a resource usage threshold. In another illustrative example, the process 900 can include increasing the number of frames from the unicast stream of media content that are stored in the memory when the information associated with the amount of resources used by the browser indicates the amount of resources is below a resource usage threshold. In another illustrative example, the process 900 can include decreasing the number of frames from the unicast stream of media content that are stored in the memory when the information associated with the amount of resources used by the browser indicates the amount of resources has increased. In another illustrative example, the process 900 can include increasing the number of frames from the unicast stream of media content that are stored in the memory when the information associated with the amount of resources used by the browser indicates the amount of resources has decreased.

In some examples, the process 900 can include extracting metadata from the unicast stream of media content, wherein the transcoded unicast stream of media content does not include the metadata. The metadata can include KLV metadata, or other suitable metadata. In such examples, the process 900 can include combining the extracted metadata from the unicast stream of media content with the transcoded unicast stream of media content, and displaying the combined extracted metadata and the transcoded unicast stream of media content.

In some examples, the process 900 can include recording, in a memory of the computing device, one or more payloads of the multicast stream.

In some examples, the process 900 can include generating one or more time stamps for one or more packets of the unicast stream of media content, and associating the one or more time stamps with the one or more packets of the unicast stream of media content. In such examples, time stamps can be added to audio packets, video packets, and metadata packets of the unicast stream of media content.

Figure 10:
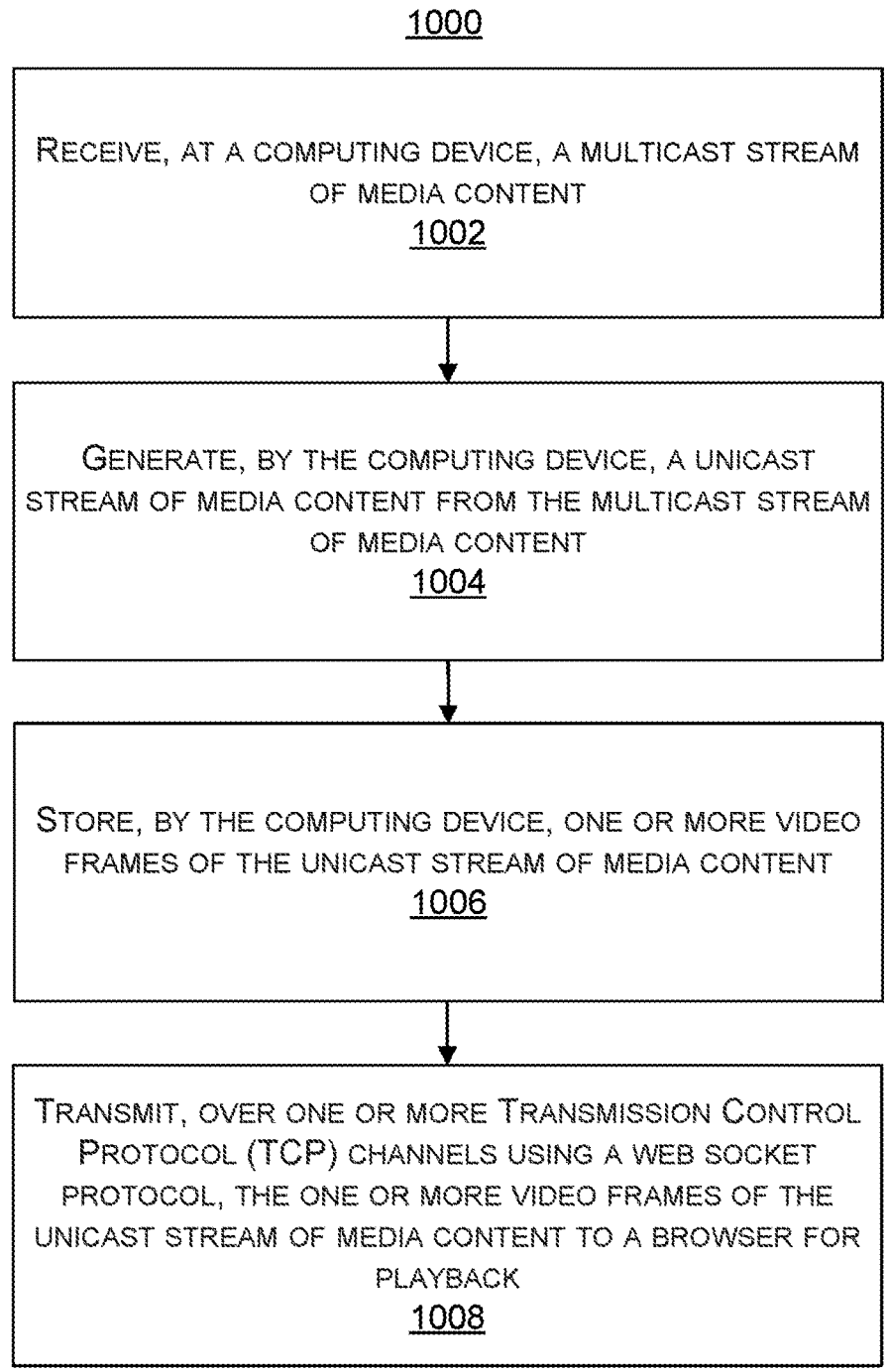
FIG. 10 is a flow diagram illustrating another example of a process for processing media data, in accordance with some examples.

FIG. 10 is a flow diagram illustrating another process 1000 for processing media data. At block 1002, the process 1000 includes receiving, at a computing device, a multicast stream of media content. At block 1004, the process 1000 includes generating, by the computing device, a unicast stream of media content from the multicast stream of media content. Blocks 1002 and 1004 are similar to blocks 902 and 904 of the process 900. At block 1006, the process 1000 includes storing, by the computing device, one or more video frames of the unicast stream of media content. At block 1008, the process 1000 includes transmitting, over one or more channels (e.g., over one or more TCP or other suitable channels using a web socket protocol), the one or more video frames of the unicast stream of media content to a browser of the computing device for playback. In some cases, the process 1000 can include displaying, by the computing device, the stored one or more video frames using the browser. The browser is operated by the computing device, in which case the transmission is performed securely within the computing device (e.g., using websockets).

In some examples, the process 1000 can include transcoding, by the computing device, the unicast stream of media content from a first media format to a second media format. In such examples, the process 1000 can include transmitting, over at least one channel (e.g., over one or more TCP channels or other suitable channels using a web socket protocol), the transcoded unicast stream of media content to a browser for playback. In such examples, the process 1000 can further include displaying, by the computing device, the transcoded unicast stream of media content using the browser. In some cases, the transcoded unicast stream of media content is displayed using the browser instead of the stored one or more video frames in response to selection of the media content as an active stream (e.g., as shown in FIG. 6). In some examples, the stored one or more video frames of the unicast stream of media content are not transcoded, and instead are from the frame grabber of the system 202 shown in FIG. 2. In such examples, the process 1000 can further include receiving, at a computing device, an additional multicast stream of media content, and generating, by the computing device, an additional unicast stream of media content from the additional multicast stream of media content. The process 1000 can include storing, by the computing device, one or more video frames of the additional unicast stream of media content. The process 1000 can further include displaying, by the computing device using the browser, the transcoded unicast stream of media content as an active stream in a first portion of a display of the computing device, and displaying, by the computing device using the browser, the stored one or more video frames of the additional unicast stream of media content in a second portion of the display of the computing device. An illustration of such an example is shown in FIG. 6, FIG. 7, and FIG. 8.

In some cases, the process 1000 can further include transcoding, by the computing device, the additional unicast stream of media content from the first media format to the second media format. In such cases, the process 1000 can include receiving input corresponding to a selection of content displayed in the second portion of the display. The content includes the one or more video frames of the additional unicast stream of media content. The process 1000 can further include displaying, in response to the selection of the content displayed in the second portion of the display, the transcoded additional unicast stream of media content as an active stream in the second portion of the display of the computing device. The process 1000 can further include displaying, in response to the selection of the content displayed in the second portion of the display, the stored one or more video frames of the unicast stream of media content in the first portion of the display of the computing device.

Similar to that described above, the process 1000 can also take into account CPU consumption and/or RAM consumption of the computing device to adjust a number of frames from the unicast stream of media content that are stored in the memory and/or to adjust a resolution of one or more video frames. The process 1000 can also or alternatively take into account an amount of resources used by the browser to adjust the number of frames or the resolution of the frames. For instance, a CPU consumption threshold, a RAM consumption threshold, and/or a resource usage threshold can be taken into account. In another example, the increase or decrease of the CPU consumption, RAM consumption, and/or resources used by the browser can affect whether the frame rate or resolution is increased or decreased.

Figure 11:
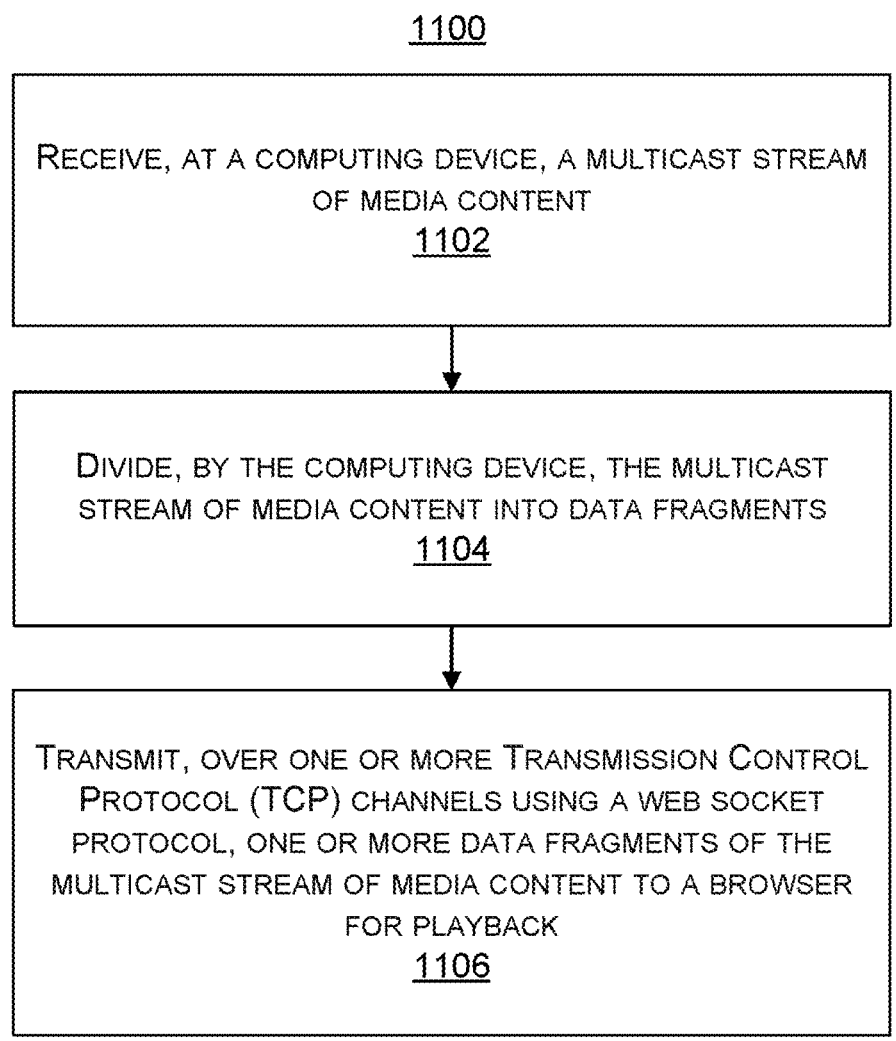
FIG. 11 is a flow diagram illustrating another example of a process for processing media data, in accordance with some examples.

FIG. 11 is a flow diagram illustrating an example of another process 1100 for processing media data. At block 1102, the process 1100 includes receiving, at a computing device, a multicast stream of media content. In some examples, the process 1100 includes decrypting one or more payloads of the multicast stream of media content.

At block 1104, the process 1100 includes dividing, by the computing device, the multicast stream of media content into data fragments. In some examples, the process 1100 includes storing the data fragments of the unicast stream of media content. In some cases, the one or more frames can be stored in one or more buffers. For example, the one or more payloads of the media content can be stored in a buffer, and the buffered payload data can be divided into data fragments of media data.

At block 1106, the process 1100 includes transmitting, over one or more Transmission Control Protocol (TCP) channels using a web socket protocol, one or more data fragments of the multicast stream of media content to a browser of the computing device for playback. The browser is operated by the computing device, in which case the transmission is performed securely within the computing device (e.g., using websockets). In some examples, the process 1100 includes displaying, by the computing device using the browser, the one or more data fragments. For example, a media player (e.g., media player 304) of the computing device can play the video corresponding to the one or more data fragments. In some examples, the process 1100 includes encrypting the one or more data fragments of media content before transmitting the one or more data fragments to the browser.

In some examples, the process 1100 includes transcoding, by the computing device, the multicast stream of media content from a first media format to a second media format. Dividing the multicast stream of media content can include dividing the transcoded unicast stream of media content into the data fragments when transcoding is performed. When transcoding is not needed, the originally received multicast stream of media can be divided into the data fragments.

In some examples, the process 1100 includes receiving the one or more data fragments of the multicast stream of media content on a local Hypertext Transfer Protocol (HTTP) port. The one or more data fragments are transmitted from the HTTP port to the browser using the web socket protocol.

In some examples, the process 1100 includes storing one or more video frames of the multicast stream of media content. In some cases, the stored one or more video frames of the multicast stream of media content are not transcoded. For example, as described above, the one or more video frames can be obtained from the frame grabber of the system 302 shown in FIG. 3. In some examples, process 1100 includes displaying, by the computing device, the stored one or more video frames using the browser.

In some examples, the process 1100 includes receiving, at the computing device, an additional multicast stream of media content, and storing one or more video frames of the additional multicast stream of media content. The process 1100 can further include displaying, by the computing device using the browser, the one or more data fragments of the multicast stream of media content in a first portion of a display of the computing device, and displaying, by the computing device using the browser, the stored one or more video frames of the additional multicast stream of media content in a second portion of a display of the computing device.

In some examples, the process 1100 includes obtaining performance data associated with the computing device, and obtaining user data associated with the computing device. The user data can include one or more types of channels viewed by a user using a media player of the computing device, a viewing configuration of the videos associated with the user, a combination thereof, or any other suitable user data. The process 1100 can further include obtaining a quality recommendation indicating a transcoding quality to generate when a particular channel is selected by the user on the computing device. In some cases, the transcoding quality includes at least one of a resolution, a frame rate, and a bit rate of a video. The quality recommendation is based on the performance data and the user data. In some cases, the quality recommendation is determined using machine learning. In some cases, the machine learning is based on a neural network. For example, the performance data and user data can be input to the neural network, and the neural network can output the quality recommendation based on processing of the performance data and user data.

In some examples, the process 1100 includes sending the performance data and the user data to a server; and receiving the quality recommendation from the server. For example, a multicast processing system (e.g., the user behavior and compute power analyzer 362 of the multicast processing system 308) can send the performance and user data to a media platform server (e.g., the media platform server 312), and the media platform server (e.g., the AI system 364) can send the quality recommendation to a transcoder of the multicast processing system (e.g., the transcoder 330 of the multicast processing system 308).

The methods and systems described above provide many benefits over existing systems. For example, as described above, in case of the multi-unicast transcoding and redistribution approach (as shown in FIG. 5A), if a server fails, the failure affects all users getting multi-unicast streams from that server. The benefit of using a multicast processing system (e.g., system 108, 208, and/or 308) is that if the multicast processing system fails at some point during the process, only the computing device that suffered the failure will be affected. Other computing devices on the network, which are joined to the multicast stream directly from the network, can continue receiving the original multicast content and process the content using respect multicast processing systems. Another example of a benefit of the distributed, client-compute approach (e.g., as shown in FIG. 5B) versus the server-based multi-unicast approach (e.g., as shown in FIG. 5A) is regarding updates and periodic maintenance.

The transcoding and redistribution servers (e.g., as shown in FIG. 5A) will need to be updated and patched for software fixes and security updates and will need to be taken down each time an update and patch is needed. When down, a server will not provide streams to computing devices, making it harder to maintain service up-time and harder for IT to coordinate and rollout updates. The client-compute approach (e.g., as shown in FIG. 5B) does not have the same type of bottleneck.

The processes 900, 1000, and 1100 may be performed under the control of one or more computer systems configured with executable instructions and may be implemented as code (e.g., executable instructions, one or more computer programs, or one or more applications) executing collectively on one or more processors, by hardware, or combinations thereof. For example, the computer system can implement one or more of the system 102, the system 202, and the system 302. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
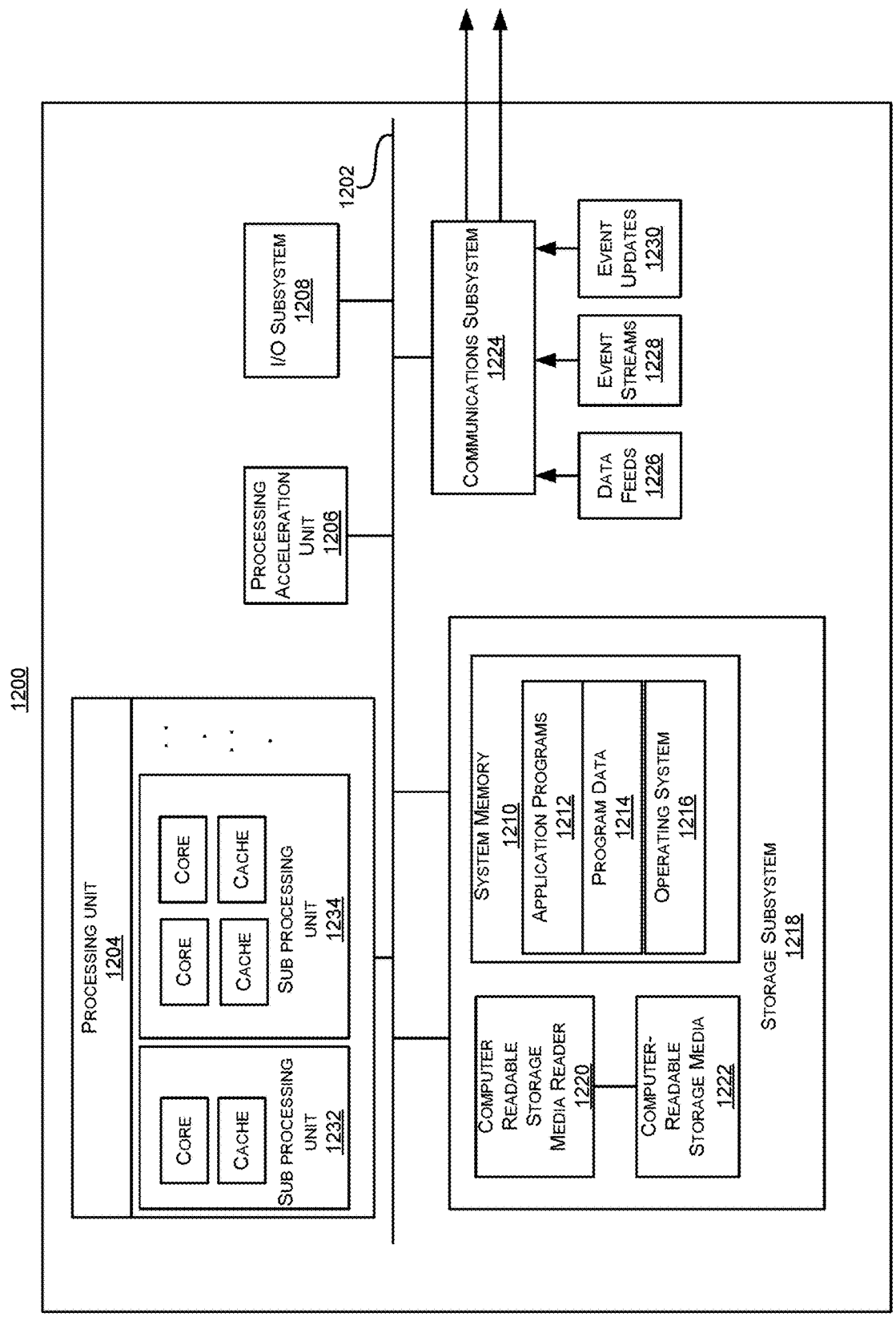
FIG. 12 is a block diagram of an example of a computer system, in accordance with some examples.

FIG. 12 illustrates an exemplary computer system 1200, in which various embodiments of the present application may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or LINUX™ operating systems, a variety of commercially-available UNIX® or UNIX-like operating systems (including without limitation the variety of GNU/LINUX™ operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present application.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1227, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the application are described with reference to specific embodiments thereof, but those skilled in the art will recognize that the application is not limited thereto. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the application are described with reference to specific embodiments thereof, but those skilled in the art will recognize that the subject matter of the application is not limited thereto. Various features and aspects of the above-described examples may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method comprising:
   aggregating, by a multicast processing system of a computing device, presentation characteristics associated with media presented by a media player of the computing device;
   receiving, from a neural network, transcoding settings for configuring the multicast processing system, wherein the transcoding settings are generated based on predictions by the neural network using the presentation characteristics;
   receiving a multicast stream of media content at the multicast processing system of the computing device;
   transcoding, by the multicast processing system of the computing device, the multicast stream from a multicast stream to a unicast stream based on the transcoding settings and performance data associated with the computing device;
   dividing, by the multicast processing system of the computing device, the unicast stream into data fragments;
   transmitting the data fragments from the multicast processing system to the media player using a web socket; and
   displaying, by the media player of the computing device, the data fragments of the unicast stream.

2. The method of claim 1, wherein the data fragments are transmitted via a Hypertext Transfer Protocol (HTTP) port of the computing device that is local to both the multicast processing system of the computing device and the media player of the computing device.

3. The method of claim 1, wherein the data fragments are transmitted over one or more transmission control protocol (TCP) channels.

4. The method of claim 1, wherein the transcoding settings indicate a quantity of channels to be displayed at a same time.

5. The method of claim 4, wherein the transcoding settings define an output resolution of the unicast stream based on the quantity of videos displayed simultaneously.

6. The method of claim 1, wherein the performance data includes current processing resources utilized by the media player.

7. The method of claim 1, wherein the transcoding settings are generated for a user of the computing device, and wherein the user is identified using an active directory system.

8. A system comprising:
   one or more processors; and
   one or more non-transitory computer-readable storage media including instructions which, when executed by the one or more processors, cause the one or more processors to:
   aggregating, by a multicast processing system of a computing device, presentation characteristics associated with media presented by a media player of the computing device;
   receiving, from a neural network, transcoding settings for configuring the multicast processing system, wherein the transcoding settings are generated based on predictions by the neural network using the presentation characteristics;

receiving a multicast stream of media content at the multicast processing system of the computing device;

transcoding, by the multicast processing system of the computing device, the multicast stream from a multicast stream to a unicast stream based on the transcoding settings and performance data associated with the computing device;

dividing, by the multicast processing system of the computing device, the unicast stream into data fragments;

transmitting the data fragments from the multicast processing system to the media player using a web socket; and displaying, by the media player of the computing device, the data fragments of the unicast stream.

9. The system of claim 8, wherein the data fragments are transmitted via a Hypertext Transfer Protocol (HTTP) port of the computing device that is local to both the multicast processing system of the computing device and the media player of the computing device.

10. The system of claim 8, wherein the data fragments are transmitted over one or more transmission control protocol (TCP) channels.

11. The system of claim 8, wherein the transcoding settings indicate a quantity of channels to be displayed at a same time.

12. The system of claim 11, wherein the transcoding settings define an output resolution of the unicast stream based on the quantity of videos displayed simultaneously.

13. The system of claim 8, wherein the performance data includes current processing resources utilized by the media player.

14. The system of claim 8, wherein the transcoding settings are generated for a user of the computing device, and wherein the user is identified using an active directory system.

15. A non-transitory computer-readable storage medium including instructions which, when executed by one or more processors, cause the one or more processors to:

aggregating, by a multicast processing system of a computing device, presentation characteristics associated with media presented by a media player of the computing device;

receiving, from a neural network, transcoding settings for configuring the multicast processing system, wherein the transcoding settings are generated based on predictions by the neural network using the presentation characteristics;

receiving a multicast stream of media content at the multicast processing system of the computing device;

transcoding, by the multicast processing system of the computing device, the multicast stream from a multicast stream to a unicast stream based on the transcoding settings and performance data associated with the computing device;

dividing, by the multicast processing system of the computing device, the unicast stream into data fragments;

transmitting the data fragments from the multicast processing system to the media player using a web socket; and displaying, by the media player of the computing device, the data fragments of the unicast stream.

16. The non-transitory computer-readable storage medium of claim 15, wherein the data fragments are transmitted via a Hypertext Transfer Protocol (HTTP) port of the computing device that is local to both the multicast processing system of the computing device and the media player of the computing device.

17. The non-transitory computer-readable storage medium of claim 15, wherein the data fragments are transmitted over one or more transmission control protocol (TCP) channels.

18. The non-transitory computer-readable storage medium of claim 15, wherein the transcoding settings indicate a quantity of channels to be displayed at a same time.

19. The non-transitory computer-readable storage medium of claim 18, wherein the transcoding settings define an output resolution of the unicast stream based on the quantity of videos displayed simultaneously.

20. The non-transitory computer-readable storage medium of claim 15, wherein the performance data includes current processing resources utilized by the media player.

* * * * *